(12) United States Patent
Verbeke et al.

(10) Patent No.: US 7,533,389 B2
(45) Date of Patent: May 12, 2009

(54) DYNAMIC LOADING OF REMOTE CLASSES

(75) Inventors: Jerome M. Verbeke, San Jose, CA (US); Neelakanth M. Nadgir, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 879 days.

(21) Appl. No.: 10/600,906

(22) Filed: Jun. 20, 2003

(65) Prior Publication Data
US 2004/0261069 A1 Dec. 23, 2004

(51) Int. Cl.
G06F 3/00 (2006.01)
G06F 9/44 (2006.01)
G06F 9/46 (2006.01)
G06F 13/00 (2006.01)

(52) U.S. Cl. .................. 719/332; 719/331; 717/166; 717/167

(58) Field of Classification Search ......... 719/310–320, 719/328–332; 717/162–178, 118
See application file for complete search history.

(56) References Cited

U.S. PATENT DOCUMENTS

| | | | |
|---|---|---|---|
| 5,606,693 A | | 2/1997 | Nilsen et al. |
| 5,668,986 A | | 9/1997 | Nilsen et al. |
| 5,737,601 A | | 4/1998 | Jain et al. |
| 5,806,075 A | | 9/1998 | Jain et al. |
| 5,924,096 A | | 7/1999 | Draper et al. |
| 6,125,402 A | * | 9/2000 | Nagarajayya et al. ....... 719/330 |
| 6,263,377 B1 | * | 7/2001 | Monday et al. ............. 719/320 |
| 6,339,841 B1 | | 1/2002 | Merrick et al. |
| 6,446,092 B1 | | 9/2002 | Sutter |
| 6,470,494 B1 | * | 10/2002 | Chan et al. .................. 717/166 |
| 6,496,850 B1 | | 12/2002 | Bowman-Amuah |
| 6,571,388 B1 | | 5/2003 | Venkatraman et al. |
| 6,578,068 B1 | | 6/2003 | Bowman-Amuah |
| 6,715,100 B1 | | 3/2004 | Hwang |
| 7,093,004 B2 | * | 8/2006 | Bernardin et al. ........... 709/219 |
| 2003/0018962 A1 | * | 1/2003 | White et al. ................ 717/166 |
| 2003/0121031 A1 | * | 6/2003 | Fraenkel et al. ............. 717/166 |
| 2004/0015936 A1 | | 1/2004 | Susarala et al. |

(Continued)

OTHER PUBLICATIONS

Eugster et al, Abstracting Remote Object Interaction in a Peer-2-Peer Environment, AMC, 2002, pp. 46-55.*

(Continued)

*Primary Examiner*—Meng-Ai An
*Assistant Examiner*—Diem K Cao
(74) *Attorney, Agent, or Firm*—Robert C. Kowert; Meyertons, Hood, Kivlin, Kowert & Goetzel, P.C.

(57) ABSTRACT

System and method for dynamic loading of remote classes. Using embodiments, remote classes may be loaded dynamically by a default class loader without the use of separate, custom class loaders. The remote class loader mechanism may locate on remote systems classes needed by code executing on the local system but not locally stored, and which therefore cannot be located and loaded by the default class loader. After locating the classes, the remote class loader mechanism may obtain copies of the classes and save them to a location indicated by the class path of the default class loader. The default class loader can then locate and load the classes from the location indicated by the class path.

60 Claims, 18 Drawing Sheets

U.S. PATENT DOCUMENTS

2004/0098447 A1    5/2004    Verbeke et al.
2004/0148326 A1    7/2004    Nadgir et al.
2004/0261069 A1    12/2004    Verbeke et al.

OTHER PUBLICATIONS

Babaoglu et al, Anthill: A Framework for the Development of Agent-Based Peer-to-Peer Systems, Sep. 2002, pp. 1-14.*

Venners, Inside the Java Virtual Machine, MCGraw-Hill Companies, Jan. 2000, chapters 3 and 5.*

Bettini et al, A Java 2 Network Class Loader, Dr. Dobb's Journal, Jul. 22, 2001, pp. 1-10.*

"Class java.lang.ClassLoad," Sun Microsystems, Inc., *Submit a bug or feature*—Version 1.1.8 of Java Platform API Specification, 1995-1999, 6 pages.

"iPlanet Application Server Overiew Guide", Chapters 2 & 4, Sun Microsystems, Inc., 2000, 14 pages.

"Programmer's Guide (Java), iPlanet Application Server," Release 6.0, Apr. 2000, pp. 289-291.

"Java Language Reference," O'Reilly, $2^{nd}$ Edition, Jul. 1997, 11 pages.

Liang et al., Dynamic Class Loading in Java Virtual Machine, ACM, (pp. 36-44), Oct. 1998.

Gong, "Secure Java Class Loading," IEEE (pp. 56-61), Dec. 1998.

IBM Technical Disclosure Bulletin, "Java Dynamic Class Loader," vol. 39, No. 11, (pp. 107-108), Nov. 1996.

Juan Carlos Soto, "The Time is Right for P2P and Project JXTA," Project JXTA Technical Introduction, Dec. 2002, (37 pages).

U.S. Appl. No. 10/869,664, filed Jun. 16, 2004, Verbeke, et al.

Charlie Kindel, "The uuid: URI Scheme," URL Working Group, Nov. 24, 1997, (5 Pages).

Leach et al., "UUIDs and GUIDs," Network Working Group, Feb. 4, 1998(29 Pages).

Goodman et al., "A Recovery Algorithm for a Distributed Database System," 1983 ACM, 1983, (pp. 8-15).

* cited by examiner

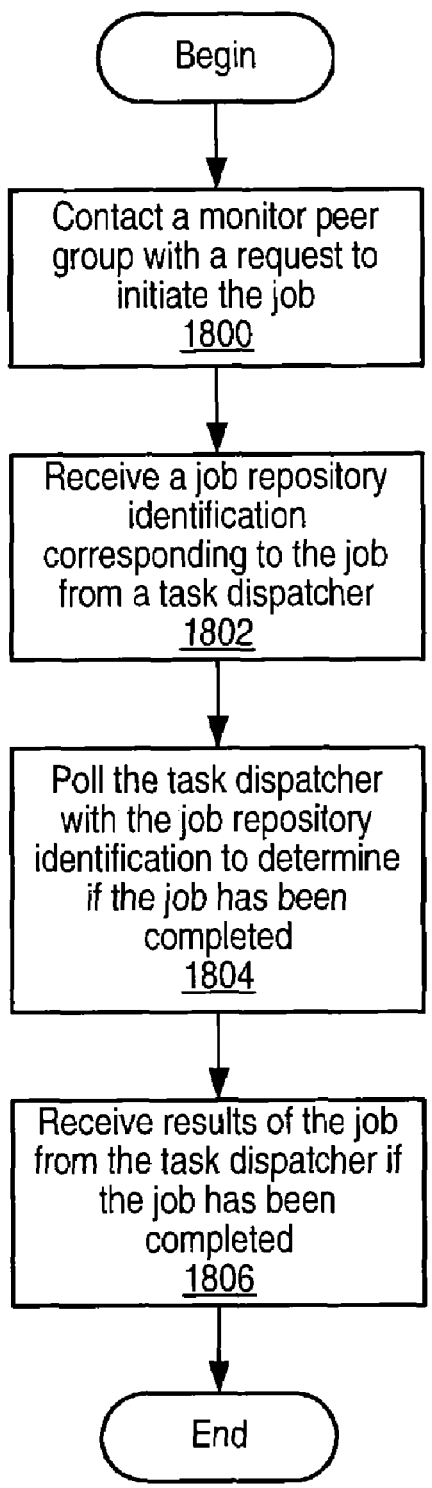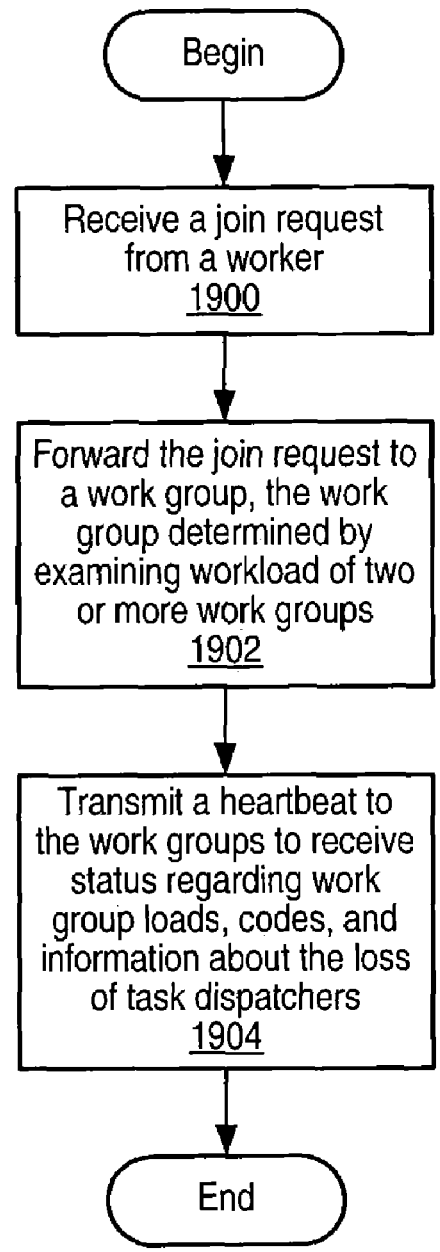
FIG. 12
FIG. 13

DYNAMIC LOADING OF REMOTE CLASSES

BACKGROUND OF THE INVENTION

1. Field of the Invention

This invention relates to computer software, and more particularly to the dynamic loading of remote classes.

2. Description of the Related Art

In a distributed computing environment, code (e.g. an application, applet, servlet, executable code fragment, or any other computer-executable code) on one machine or virtual machine (e.g. e.g. Java Virtual Machine (JVM)) can be run on different machines and/or different virtual machines (e.g. JVMs). Thus, code or code fragments may be transferred between machines and/or virtual machines. For object-oriented code, a machine or virtual machine may rely on the dynamic loading of classes to run the code remotely.

Class loaders are one of the cornerstones of virtual machine architectures such as the JVM architecture. Class loaders may enable a virtual machine to load classes without knowing anything about the underlying file system semantics, and may allow applications to dynamically load classes such as Java™ classes as extension modules. For example, JVM has an embedded class loader called the default or system class loader. The default class loading behavior in the JVM is to load the class file from a specified location (specified in a class path) into the memory and to execute the byte code as and when the request comes in for the particular class. The default class loader may cache the class once it loads the class.

Virtual machines such as JVM may provide a facility by which a user can introduce a custom class loader. For example, in JVM, a hook is provided to the loading mechanism through the custom class loaders. Programmatically speaking, class loaders are ordinary objects that may be defined in code (e.g. Java™ code). In Java™, class loaders are instances of subclasses of abstract class Classloader.

In Java, a custom class loader may load a class before or after the default class loader attempts to load the class. Therefore, certain policies pertaining to loading classes, maintenance, fetching classes, etc. may be implemented by the custom class loader. The custom class loader may also, for example, specify the remote location from which the classes are loaded, and/or assign appropriate security. Class loaders may be used to control security of the classes loaded. For example, a custom class loader may check for a valid signature for the class before loading it and making it available for other objects to use. Class loaders may be used in applets to restrict loading of classes not on the system class path.

In Java™, classes and interfaces are dynamically loaded, linked, and initialized. Loading is the process of finding the binary form of a class or interface type with a particular name and constructing, from that binary form, a Class object to represent the class or interface. For example, a class or interface C's loading is triggered by another class or interface D, which references C through its runtime constant pool. Class or interface loading may also be triggered by D invoking methods in certain Java™ class libraries such as Reflection. Once a class is loaded, it is linked and resolved. Linking involves verifying and preparing a class, its direct superinterfaces, its direct superclass and its element type (if it is an array type). The process of dynamically determining concrete values from symbolic references in the runtime constant pool is referred to as resolving or resolution.

The above information on class loaders, class loading, and class reloading refers to the Java™ programming language and to the Java™ Virtual Machine (JVM) architecture as an example of an implementation of class loaders, loading, and reloading. This information, however, may be relevant to other architectures, programming languages, environments including virtual machine environments, platforms, applications, application servers and/or implementations of class loaders.

In Java, to use a class, the class has to be in the class path of the default class loader, or alternatively a custom class loader may be provided. Custom class loaders, however, may conflict with the use of other class loaders, including the default class loader. For example, classes remotely loaded by a custom class loader may conflict with classes normally available through the default class loader. Therefore, it is desirable to provide a mechanism to remotely load all classes needed to run, for example, an application in a distributed computing environment through the default class loader, thus avoiding the use of custom class loader to remotely load the classes.

JXTA

JXTA technology is a set of open protocols that allow any connected device on the network ranging from cell phones and wireless PDAs to PCs and servers to communicate and collaborate in a P2P manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that share a common interest. Peer groups are also identified by unique IDs. Peers can belong to multiple peer groups, can discover other entities and peer resources (e.g. peers, peer groups, services, content, etc.) dynamically and can also publish themselves and resources so that other peers can discover them.

SUMMARY

Embodiments of a system and method for dynamic loading of remote classes are described. Using embodiments, remote classes may be loaded dynamically by a default class loader without the use of separate, custom class loaders. The remote class loader mechanism may locate on remote systems classes needed by code executing on the local system but not locally stored, and which therefore cannot be located and loaded by the default class loader. After locating the classes, the remote class loader mechanism may obtain copies of the classes and save them to a location indicated by the class path of the default class loader. The default class loader can then locate and load the classes from the location indicated by the class path.

In one embodiment, a class needed by code executing on a system may be determined. In one embodiment, the code may be executing within a virtual machine on the system, e.g. on a Java Virtual Machine (JVM). In one embodiment, a default class loader associated with the code may determine that the class is not locally stored in a directory indicated by its class path. An exception or other indication may be generated, and the generated indication may be detected by an instance of a remote class loader mechanism on the system. The needed class may then be obtained by the remote class loader mechanism from a remote system. In one embodiment, a request message may be sent to the remote system indicating the desired class. In one embodiment, the request message may be broadcast to one or more systems on a network, for example one or more peers in a peer group, to locate the desired class. The remote system may respond to the request message by locating the requested class in local storage (e.g.

in a directory indicated by a class path on the remote system, or alternatively in a default directory for storing remote classes). The located class may then be sent to the remote class loader mechanism on the requesting system.

Upon receiving the requested class, the remote class loader mechanism may store the class in a location indicated by a class path of a default class loader on the system. In one embodiment, this may be a directory specified by a user prior to running the code. In another embodiment, this may be a default directory specified for storing remote classes. The default class loader on the system may then locate and load the class from the location specified in the class path.

In one embodiment, the remote class loader mechanism may be used in a distributed computing system. In the distributed computing system, to run an application across several nodes, the application may be divided into N different code fragments. The application may then be sent to the framework, and a master node of the framework may then distribute the code fragments of the application across a plurality of worker nodes that participate in calculations for the application. Each of these worker nodes may include an instance of the remote class loader mechanism. On a worker node, the remote class loader mechanism may locate and download classes needed for execution of the code fragment into one or more locations indicated by the class path of a default class loader on the worker node. The default class loader may then load the class from the location indicated by the class path.

BRIEF DESCRIPTION OF THE DRAWINGS

FIG. 12 is a flow diagram illustrating a method for submitting a job to a distributed computing environment according to one embodiment.

FIG. 13 is a flow diagram illustrating a method for adding a worker to a work group according to one embodiment.

Figure 1:
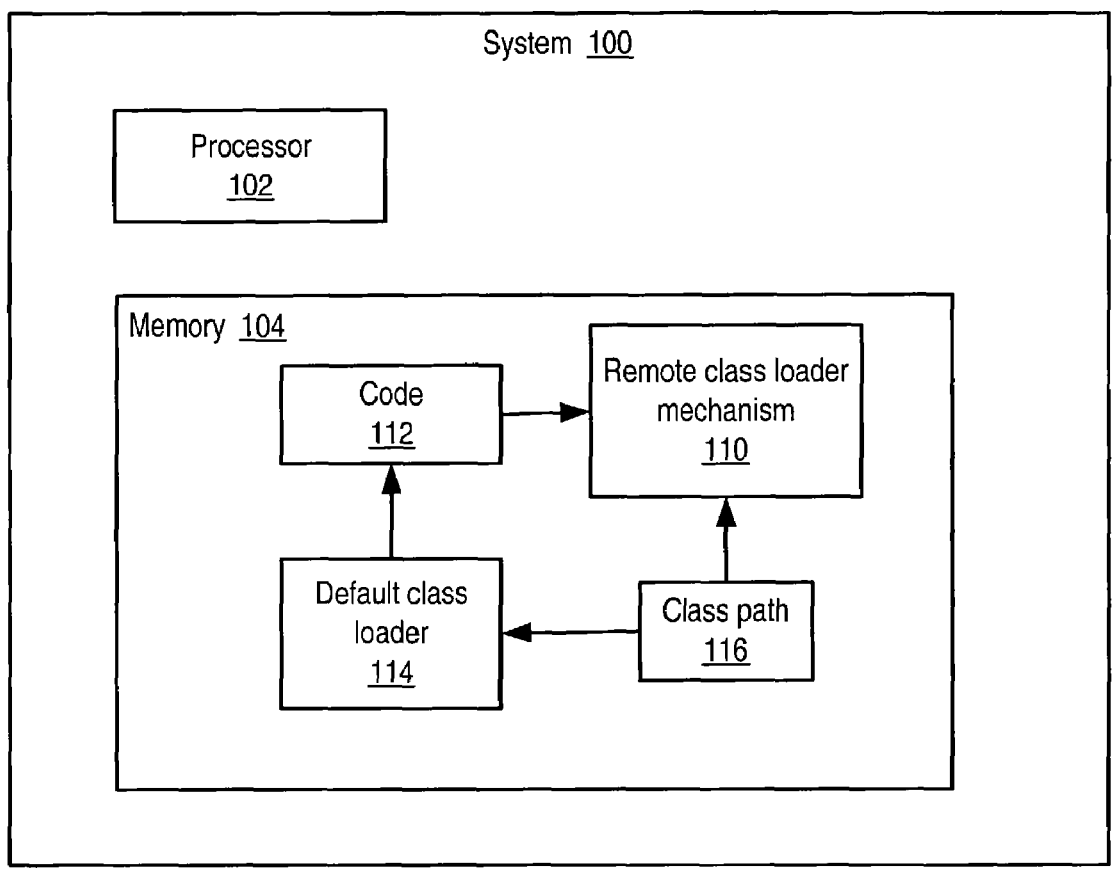
FIG. 1 illustrates a system implementing a remote class loader mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for dynamic loading of remote classes are described. Using embodiments of this remote class loader mechanism, remote classes may be loaded dynamically by a default class loader without the use of separate, custom class loaders. The default class loader can only load classes from local locations (e.g. directories) specified in the class path. The remote class loader mechanism may locate on remote systems classes needed by code executing on the local system but not locally stored, and which therefore cannot be located and loaded by the default class loader. After locating the classes, the remote class loader mechanism may obtain copies of the classes and save them to a location (e.g. a directory on disk storage) indicated by the class path of the default class loader. The default class loader can then locate and load the classes from the location indicated by the, class path.

For example, a system may try to run an application remotely; but may be missing some files or classes that are needed to run the application. The missing files or classes need to be obtained from a system that has the missing files or classes. In the prior art, custom class loaders are used to locate and obtain copies of the missing files or classes when needed. Embodiments preferably make it unnecessary to write a custom class loader to remotely load the classes by providing a mechanism to locate and copy the files or classes to locations indicated by a class path used by the default class loader from which the default class loader can load the classes. Whatever classes are needed at runtime to run the application are put into a location (e.g. a directory) indicated by the class path that may be dynamically looked at by the default class loader. If a class is missing, the class may be downloaded from a remote machine and put in a directory where the default class loader can find it and from which the default class loader can load it to allow the application to be run.

As an example, assume the class path includes the exemplary location LOCA for storing classes copied from remote systems. The classes will be copied to the system and the remote class loader mechanism will save them in the location LOCA, from which the default class loader may dynamically locate and load the classes. The location LOCA is specified in the system class path, so it can be different on different systems.

Embodiments of the remote class loader mechanism may be used, for example, in distributed computing systems that distribute tasks to different nodes on the network to perform a job, such as the exemplary peer-to-peer distributed computing system described below. An instance of the remote class loader mechanism on each of these nodes may download class files from remote systems to execute as needed. Before saving the class, the remote class loader mechanism examines the class path to determine where to save the classes. This ensures that any new classes downloaded are immediately available for access by the default class loader.

As another example, embodiments of the remote class loader system may be used in peer-to-peer network environments. Embodiments may be used on peer nodes in a peer-to-peer environment on a network in accordance with one or more peer-to-peer platform protocols for enabling the peer nodes to discover each other, communicate with each other, and cooperate with each other to form peer groups in the peer-to-peer environment. In one embodiment, the peer-to-peer platform may be the JXTA platform.

FIG. 1 illustrates a system implementing a remote class loader mechanism according to one embodiment. System 100 may be any of various types of devices, including, but not limited to, a personal computer system, desktop computer, laptop or notebook computer, mainframe computer system, workstation, network computer, Personal Digital Assistant (PDA), cell phone, pager, smart appliances or other suitable device. In general, system 100 may be any device with a digital heartbeat. System 100 may include at least one processor 102. The processor 102 may be coupled to a memory 104. Memory 104 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 100 may couple over a network to one or more other devices via one or more wired or wireless network interfaces.

System 100 may include, in memory 104, remote class loader mechanism 110, code 112, default class loader 114, and class path 116. In one embodiment, system 100 may include a virtual machine in memory 104 (e.g. a Java Virtual Machine (JVM)) that may include remote class loader mechanism 110, code 112, default class loader 114, and class path 116. In one embodiment, two or more virtual machines may be included simultaneously in memory 104.

Code 112 may be an application, applet, servlet, executable code fragment, or any other computer-executable code. In one embodiment, the code may be written in a bytecode-level language recognized by all or a subset of the systems in a network (e.g. the Java programming language). Default class loader 114 may determine a class needed by code 112 to execute, look at one or more locations indicated by class path 116 to determine if the class is locally available (e.g. in one or more directories on system 100 indicated by class path 116), and, if the class is locally available, load the class for code 112 to use during execution. If the class is not locally available, in one embodiment code 112 may generate an indication that the class is not locally available (e.g. an exception, or a value returned by a function). In another embodiment, default class loader 114 may generate the indication that the class is not locally available. Remote class loader mechanism 110 may detect the indication that the class is not locally available, obtain the class from a remote source (e.g. another system that stores the class), and copy the class from the remote source to a location (e.g. a directory) indicated by class path 116. Default class loader 114 may then load the class from the location indicated by class path 116.

Default class loader 114 looks in all locations specified in class path 116 to load classes that are needed by code 112 but are not currently in system memory or, if code 112 is executing in a virtual machine, in the virtual machine. For example, if there is a class FOO that is not in system memory, default class loader 114 will look in the locations specified in class path 116 to try to locate a FOO class file and, if it locates the class file, load the class file and resolve the functions and classes that are missing. If class file FOO cannot be found in class path 116 by default class loader 114, an exception or other indication may be generated. The generated indication invokes the remote class loader mechanism 110 to locate and download the FOO.class file from a remote machine into a local directory that is indicated by of the class path. In response to the generated indication (e.g. exception), remote class loader mechanism 110 may interrogate one or more remote machines to find out if one of the remote machines has the FOO.class file available and, if it does, transfer the class file, for example over HTTP using messaging (e.g. XML messaging), to the local machine and save it in a directory indicated by class path 116. In one embodiment, one or more directories in which remotely loaded classes are to be saved maybe specified in class path 116.

In one embodiment, class path 116 includes a list of directories. The names of the directories do not have to coincide with class names. In one embodiment, the class path 116 includes names of directories in which the default class loader will search for files that have the names of desired class. In Java, the name of the class should be identical to the file name that contains the class.

Remote class loader mechanism 110 looks at class path 116 and determines a directory that is in class path 110 to save the remote class into. In one embodiment, one or more directories in class path 116 may be specified for later use in downloading and storing remote classes. In one embodiment, it may be left to the user to determine which directory or directories to save remote classes to. In one embodiment, a user, prior to executing code 112, may set up a class path 116 that has one or more directories reserved for remote class loading. In one embodiment on Unix machines, one or more temp directories may be specified. When remote class loader mechanism 110 downloads one or more classes from a remote source, remote class loader mechanism 110 may determine one or more of the directories specified in class path 116 for storing downloaded remote classes. Default class loader 114 may then locate and load the classes using the class path.

In one embodiment, on virtual machines such as JVM, each application (e.g. code 112) may have its own unique class path 116 to be used by the default class loader 114. In one embodiment, the class path 116 may be specified or set up before an application starts. Starting the application starts the virtual machine. In one embodiment, a script may be used to set up the class path 116 for the default class loader 114 prior to running the application. Thus, a script or other mechanism for each application may set up the unique class path 116 for the particular application. In one embodiment, the default class path may be the directory from which the application is running, if no class path is specified. In one embodiment, rather than having user-specified directories, a default directory may be specified for use in all class paths 116 for storing and locating remotely loaded classes.

In one embodiment, each virtual machine on a system has its own instance of default class loader 114. The default class loaders 114 may be the same code, but there are individual instances for each virtual machine. In one embodiment, two or more virtual machines may be running on a system if several applications are running, each with its own instance of the default class loader.

When an exception or other indication is generated due to a class not being located locally by default class loader 114, the name of the class file is known. Remote class loader mechanism 110 may, in response to the exception or other indication, look for the class file on one or more remote systems. In one embodiment, the remote system may include a search mechanism to search for requested classes in one or more directories on the remote machine, for example in the one or more directories specified in the class path associated with the application being run remotely for which the class file has been requested. In one embodiment, the class file may be searched for in the directory or directories on the remote system specified for storing remote classes and indicated in the class path of the remote system. In one embodiment, there may be one or more default directories, common to all systems, for storing remote classes, and the remote system may search for the requested class file in the default directory or directories.

It is possible that two class files with the same name may include different class definitions. Thus, it is possible that the remote class loader mechanism 110 may receive the wrong class file; a class file with the right name but the wrong contents. In one embodiment, if this happens, then an exception may be generated when default class loader 114 tries to load the class or when code 112 tries to use the class. In one embodiment, remote class loader mechanism 110 may detect this exception and then attempt to locate and download a different class file that includes the correct class. In one embodiment, remote class loader mechanism may request a different class file from the remote system from which it got the wrong class file. Alternatively, remote class loader mechanism may send requests to one or more other remote systems to search for the correct class file.

In one embodiment, a checksum mechanism based on the content of the class file may be used to determine if the downloaded class file is the correct class. Checksum information on the class may be contained in the binary of code 112. The checksum that is in code 112 may be compared with the checksum of the downloaded class file to determine if it is the correct class. If it is the wrong class, remote class loader mechanism 110 may then search for the correct class file. In one embodiment, remote class loader mechanism 110 may perform the comparison upon receiving the class file. In another embodiment, code 112 may perform the comparison before attempting to use the class. In one embodiment, remote class loader mechanism 110 may include a checksum or other information in its request message sent to one or more other remote systems so that the remote systems may check a class file to see if it is the correct class file.

Figure 2A:
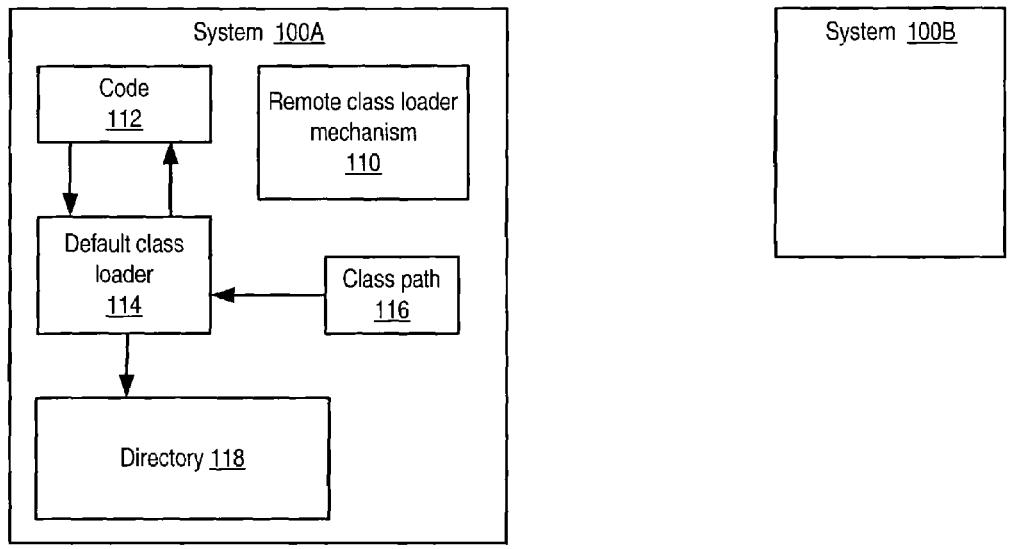
FIGS. 2A-2D illustrate a remote class loader mechanism locating and downloading a class from a remote system according to one embodiment.

FIGS. 2A-2D illustrate a remote class loader mechanism locating and downloading a class from a remote system according to one embodiment. In FIG. 2A, code 112 on system 100A may need a class to execute. Default class loader 114 may search for the class in one or more directories 118 indicated by class path 116. If the class is not found, default class loader may notify code 112 that the class is not locally available.

Figure 2B:
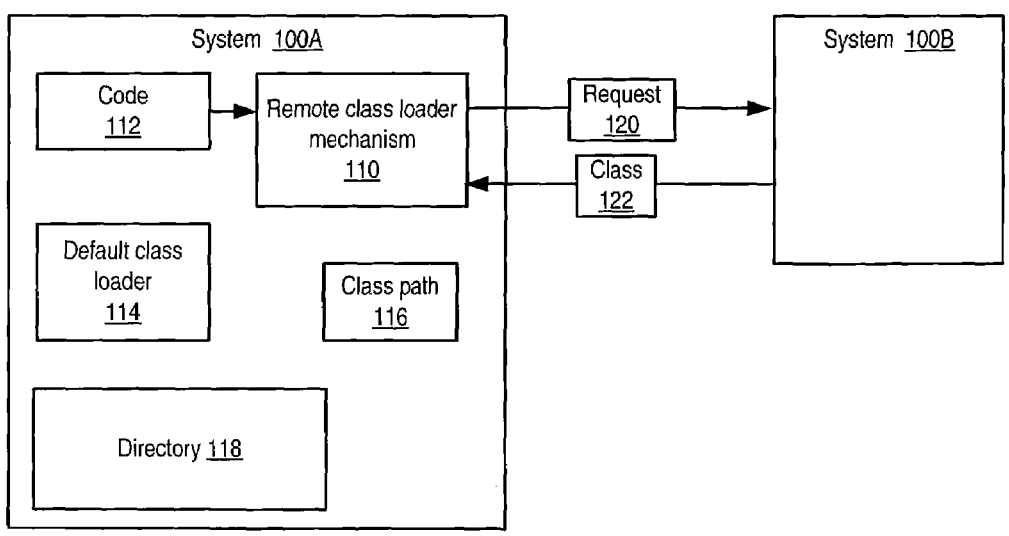

In FIG. 2B, code 112, in response to the class not being locally available, may generate an exception, which may be detected by remote class loader mechanism 110. In another embodiment, instead of an exception, a function may return a value that indicates to remote class loader mechanism 10 that the class is not locally available. Remote class loader mechanisms 110 may then send a request 120 for the class to remote system 100B. In one embodiment, remote class loader mechanism 110 may send request 120 to one or more systems that it thinks has the desired class, for example a system from which code 112 was previously downloaded to system 10A. In one embodiment, remote class loader mechanism 110 may broadcast request 120 to systems on a network to locate the desired class. In one embodiment, system 100A may be a member peer in a peer group, and may broadcast message 120 to other member peers in the peer group. System 100B may then locate the class file containing the class in a local directory and transmit class 112 to remote class loader mechanism 110 in response to request 120. In one embodiment, request 120 and class 122 may be transmitted over the network using HTTP messaging (e.g. XML messaging).

Figure 2C:
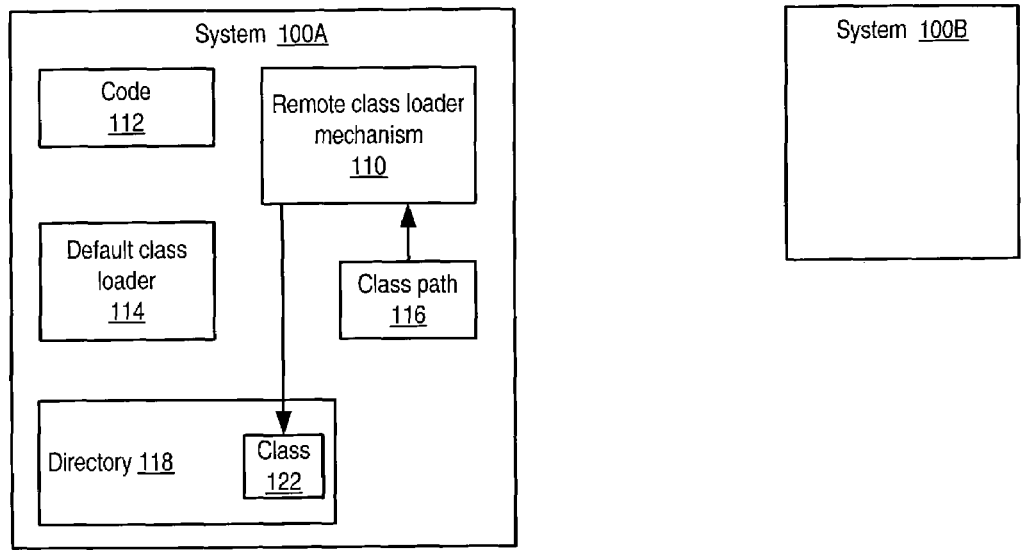
Figure 2D:
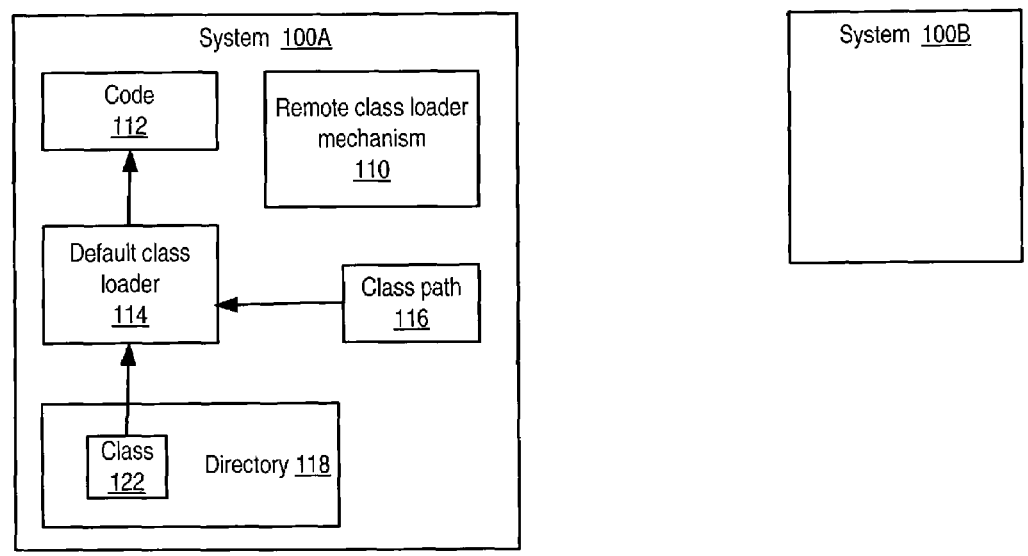

In FIG. 2C, remote class loader mechanism 110 may look in class path 116 to determine a directory in which to store class 122. Remote class loader mechanism may then store class 122 in the determined directory 118. In FIG. 2D, default class loader 114 may then locate class 122 in the directory 118 indicated by class path 116 and load the class 122 for use by code 112.

Figure 3:
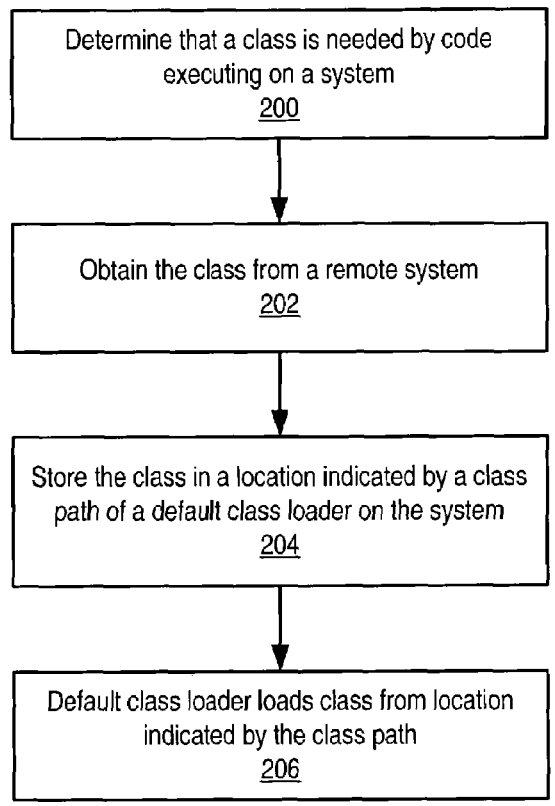
FIG. 3 is a flowchart illustrating a method for the dynamic loading of remote classes according to one embodiment.

FIG. 3 is a flowchart illustrating a method for the dynamic loading of remote classes according to one embodiment. FIG. 3 illustrates means for determining that a class is needed to execute code on a system, means for obtaining the class from a remote system via a network, and means for storing the class in a location indicated by a class path of a default class loader on the system. As indicated at 200, a class needed by code executing on a system (e.g. an applet, servlet, application, or code fragment) may be determined. In one embodiment, a default class loader associated with the code may determine that the class is not locally stored in a directory indicated by its class path. In one embodiment, an exception may be generated, and the generated exception may be detected by an instance of a remote class loader mechanism on the system. In another embodiment, a function may generate or return a value that may be detected by the instance of the remote class loader mechanism on the system. As indicated at 202, the needed class may be obtained from a remote system. In one embodiment, a request message may be sent to the remote system indicating the desired class. In one embodiment, the request message may be broadcast to one or more systems on a network, for example one or more peers in a peer group, to locate the desired class. The remote system may respond to the request message by locating the requested class in local storage (e.g. in a directory indicated by a class path on the remote system, or alternatively in a default directory for storing remote classes). The located class may then be sent to the remote class loader mechanism on the requesting system. In one embodiment, the request message and the response message(s) including the class may be transmitted over the network using HTTP messaging (e.g. XML messaging).

As indicated at 204, upon receiving the requested class, the remote class loader mechanism may store the class in a location indicated by a class path of a default class loader on the system. In one embodiment, this may be a directory specified by a user prior to running the code. In another embodiment, this may be a default directory specified for storing remote classes. As indicated at 206, the default class loader on the system may then locate and load the class from the location specified in the class path.

In one embodiment, a remote class loader mechanism may be used in applications of a framework for parallelizing an application across a plurality of nodes, such as the exemplary distributed computing system described below. In the distributed computing framework, to run an application across several nodes, the application may be divided into N different code fragments. The application may then be sent to the framework, and the framework may then distribute the application across a plurality of different nodes that participate in calculations for the application.

Embodiments of the remote class loader mechanism may be used in downloading classes used in the framework. Nodes that are participating in the framework typically do not have the applications that may be sent to them; any application that can be fragmented can be sent to the framework (e.g. to a master node) and code fragments of the application then may be sent to different nodes, which may be referred to as worker node. The worker nodes may not have all the classes needed to run any particular application or code fragment of an application. Instances of remote class loader mechanism on worker nodes may ask the submitter of the application (e.g. a master node) to send them the classes when needed; the received classes may be saved in locations indicated by class paths of instances of the default class loader on the worker nodes.

Thus, worker nodes in a distributed computing system are given applications or code fragments of applications to run, but may not know anything about the particular applications they are running. The worker nodes may need to download one or more class files needed to run a particular application. Embodiments of the remote class loader mechanism allow the worker nodes to download needed classes while using the default class loader, thus not requiring custom class loaders for the worker nodes.

Whenever a master node supplies a task (code fragment) for a worker node to run, the master node may not know all the classes that the worker node may need to run the code fragment/task. Initially, master may send only classes it thinks will be necessary for the worker node to run its code fragment. The worker node may save these classes in locations indicated by its class path. If the worker node encounters some classes it does not have locally stored, it requests the classes from the master node through the remote class loader mechanism, which stores the received classes in local storage in a directory indicated in the class path of the default class loader.

In one embodiment, initially, the worker node may request the class(es) it needs to start the application or task through the remote class loader mechanism, which stores the received classes in one or more directories indicated by the class path of the default class loader. Later, the worker node may request classes as needed through the remote class loader mechanism, which again stores the received classes in one or more directories indicated by the class path of the default class loader.

Figure 4:
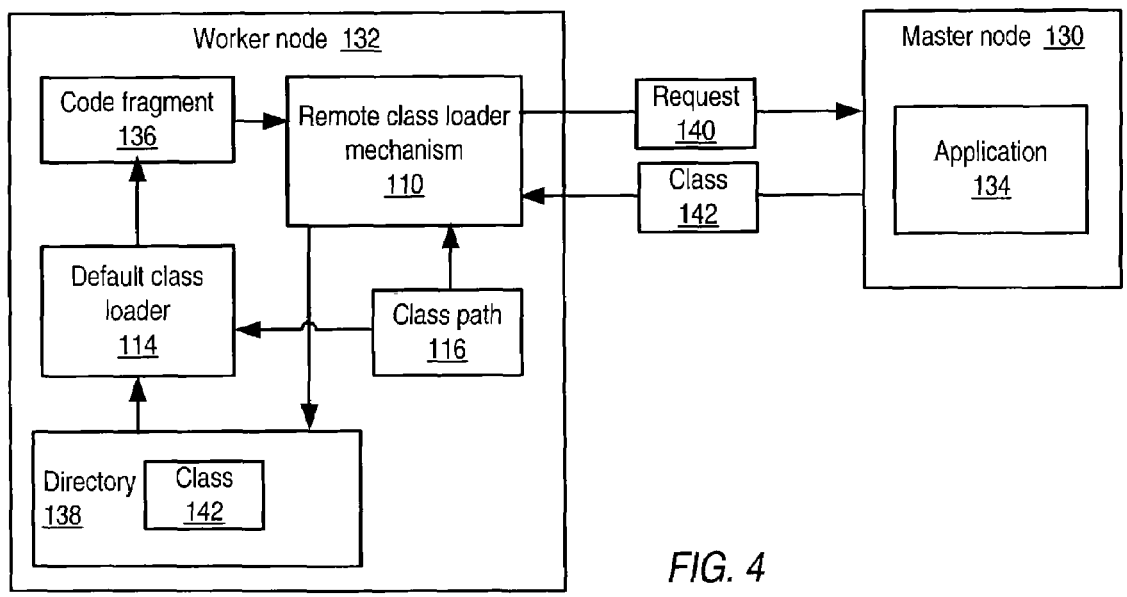
FIG. 4 illustrates a remote class loader mechanism locating and downloading a class from a remote system in a distributed computing system according to one embodiment.

FIG. 4 illustrates a remote class loader mechanism locating and downloading a class from a remote system in a distributed computing system according to one embodiment. A worker node 132 may be performing a task using code fragment 136, provided by master node 130. Worker node 132, while executing the code fragment, may discover it needs a class. If the class is not found locally by default class loader 114, remote class loader mechanism 110 may send a request 140 to master node 130 for the class. In one embodiment, the master node 130 may be the only node in the distributed computing system that the worker node 132 is aware of. The master node 130 may have the class locally stored and return the class 142 to remote class loader mechanism 110, which may then store the class 142 in a directory 138 indicated by class path 116. If the master node 130 does not have the class locally stored, the master node 130 may obtain the class from another remote node, e.g. the system that provided the application to the master node 130 for execution. Alternatively, worker node 132 may send out a broadcast message to one or more other peers in a peer group to locate and download the needed class. In one embodiment request 140 may include information about the class, e.g. its checksum, to help in finding the correct class. After class 142 is stored in directory 138, default class loader 114 may load the class for code fragment 136 to use.

Exemplary Distributed Computing System

Embodiments of a distributed computing framework, and a distributed computing mechanism which may be implemented with the framework, are described. Embodiments of the remote class loader mechanism may be used in embodiments of the exemplary distributed computing system to dynamically load remote classes on a node using a default class loader and without requiring a custom class loader.

Exemplary Distributed Computing Framework

Embodiments of an exemplary system and method for submitting computational tasks in a distributed heterogeneous networked environment are described. Embodiments of this exemplary distributed computing framework may utilize peer groups in a distributed architecture to decentralize task dispatching and post-processing functions and to provide the ability to manage and run many different applications simultaneously. Embodiments may provide a dynamic grid, where nodes are added and removed during the lifetime of the jobs. Embodiments may provide redundancy, where the dynamic nature of the grid does not affect the results. In embodiments, computational resources may be organized into groups, such that inter-node communications does not occur in a one-to-all or all-to-all mode. Embodiments may provide heterogeneity, where a wide variety of computational platforms are able to participate. Embodiments of this exemplary distributed computing framework may be used to implement embodiments of the distributed computing mechanism described below. Embodiments of the remote class loader mechanism may be used in mechanisms implemented with the exemplary distributed computing framework, such as embodiments of the distributed computing mechanism described below, to dynamically load remote classes on a node using a default class loader and without requiring a custom class loader.

One embodiment may utilize peer groups, such as those of the JXTA platform, as a fundamental building block of the framework. Using peer groups, resources may be grouped according to functionality, in the process building redundancy and restricting communication messages to relevant peers.

In one embodiment, the distributed computing framework may include one or more monitor peer groups, one or more worker peer groups, one or more task dispatcher peer groups, and one or more repository peer groups. A monitor group may be a top-level group that coordinates the overall activity of the framework, including handling request for peers to join the framework and their subsequent assignment of the node to peer groups, and high-level aspects of the job-submission process. A worker group may be responsible for performing the computations of a particular job, while a task dispatcher group distributes individual tasks to workers. A repository group may serve as a cache for code and data. One of ordinary skill in the art will recognize that not all of the above groups need to be present in order to implement the present invention. Each group may be independently implemented on top of other architectures to provide various advantages described above.

A single node may belong to several peer groups in the framework, and likewise there may be many instances of each peer group within the framework. These interconnectivity and redundancy features may preferably handle the dynamic nature of the environment, where resources are added and removed on a regular basis.

In one embodiment, there may be two parts to a job: the code used by the worker nodes, which is common for all tasks within the global job, and the data used by the code, which generally varies for each task within a global job. For simplicity, the data used by the code will be referred to as a task. Many types of data are divisible into multiple tasks. The data segment of the job submission may range from being simple parameters that vary from task to task, to large data sets required for computations. The storage of the two elements for a job may be distributed through the network in a decentralized fashion. The management of these components may fall under the repository peer group.

Figure 5:
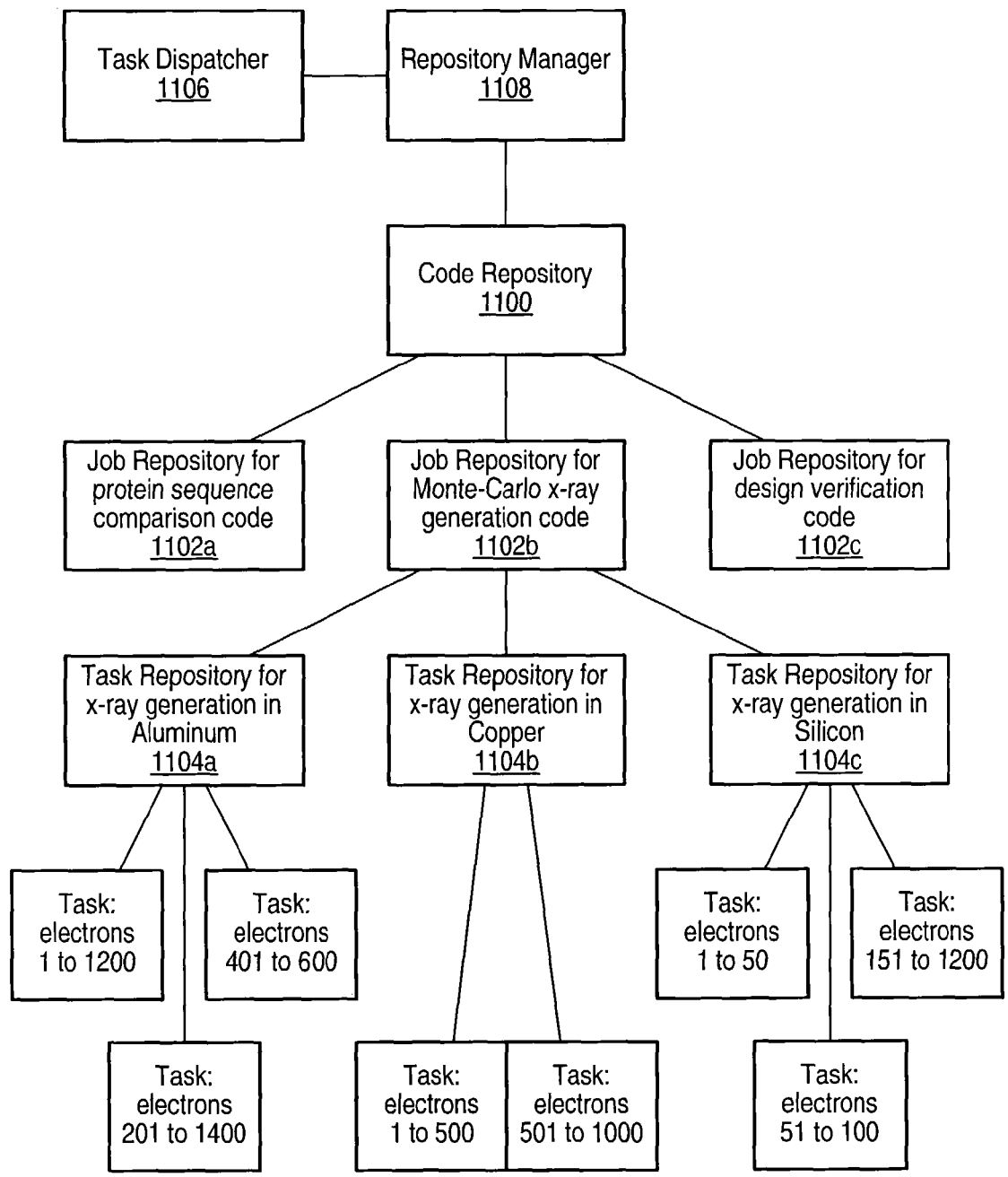
FIG. 5 is a diagram illustrating an example of a repository peer group according to one embodiment.

FIG. 5 illustrates an example of a repository peer group according to one embodiment. The code repository 1100 may include three codes, each having its own job repository 1102a, 1102b, and 1102c. Each job then may then be composed of a different number of tasks 1104a, 1104b, and 1104c. The interaction of the code repository group 1100 with the rest of the framework may be through the task dispatcher group 1106. Upon receiving the job submission, the task dispatcher may poll the repository to determine the status of the code within the code repository. If the repository is current, then the code may be retrieved, and otherwise may be uploaded and stored in the code repository. For each job, a job repository may be created. A job repository is a tree containing a repository for tasks within the job, which are submitted by the end-user. In one embodiment, the task dispatcher may not be required to keep track of the job submitters that contacted it.

In one embodiment, the submission of a job may proceed as follows The job submitter may send a message (e.g. a markup language message such as an Extensible Markup Language (XML) message) to the task dispatcher with identification (such as a name) of the code to be run. The task dispatcher then may check with the repository manager 1108 to see whether the identification of the code to be run is already in the code repository. If it is not in the code repository, then a task dispatcher may request the classes for the code from the job submitter. The job submitter may send the classes for the code to the task dispatcher, which may submit them to the repository manager. The repository manager may create a job repository for this code, where the classes are stored.

Turning now to the worker groups, within each worker group there may be a task dispatcher. Idle workers may regularly poll the task dispatcher relaying information regarding resources available, including codes the worker has cached. Based on this information, the task dispatcher may poll the repository for tasks to be performed on available codes, or alternatively for codes to be downloaded to the workers. Upon distribution of code and tasks, the worker may perform the task and return the result to the task dispatcher. In one embodiment, the task dispatcher may not be required to keep track of which workers are performing which tasks.

In one embodiment, handshaking may not be required between the worker and the task dispatcher. Both are working in such a manner that lost messages may not affect the completion of a job. As such, a worker may become inaccessible during execution, which would not affect the completion of a job. The task dispatcher may update the repository with information about task completion, and redundant tasks may be performed to account for node failure.

In one embodiment, the joining of workers to the framework to execute the work contained in the code repository may proceed as follows. Workers may first contact the task dispatcher by sending a message (e.g. an XML message). If the worker has recently been working on some codes, it may send a list of recently worked-on codes along with this message. Then the task dispatcher may look at the codes sent by the worker and decide based on this which code the worker may work on. Once the code is determined, the task dispatcher may send the classes required to run the code to the worker. If there are no tasks available for execution in the code repository, the task dispatcher may tell the worker to sleep for a period and to check again for work afterwards. In one embodiment, this period is a tunable parameter. The worker may store the classes in a directory that belongs to its class path so that these classes may be loaded dynamically at code execution time. Afterwards, the worker may request tasks for the code from the task dispatcher. The task dispatcher may hand this request to the repository manager. The repository manager may check whether a job has been submitted for this code; that is, if there is a job repository for this code. If several jobs have been submitted, i.e., the job repository contains several task repositories, in one embodiment, the repository manager may choose the task repository that was submitted first and of which all the tasks have not yet completed. From this task repository, the repository manager may choose a task that has not yet been submitted to a worker. If all tasks have already been submitted, the repository manager may choose a task that has already been submitted but has not completed yet. The chosen task may be handed back to the task dispatcher, who sends the chosen task to the worker.

The worker may receive the task and execute it. Once the execution is complete, the worker may send the task back to the task dispatcher. The returned task may include the results of the execution. The task dispatcher gives the task to the repository manager, which may store the task in the relevant repository. At this point, the worker may request another task from the task dispatcher, if desired.

A work group may be composed of a group of peers. In one embodiment, access to this peer group may be limited, and nodes outside the peer group may not access the peer group without special authorization. Using a peer group may preferably enable intercommunication to be limited to a set of peers, and may preferably reduce or eliminate processing of messages from the outside world that may reduce the overall communication bandwidth within the peer group.

Figure 6:
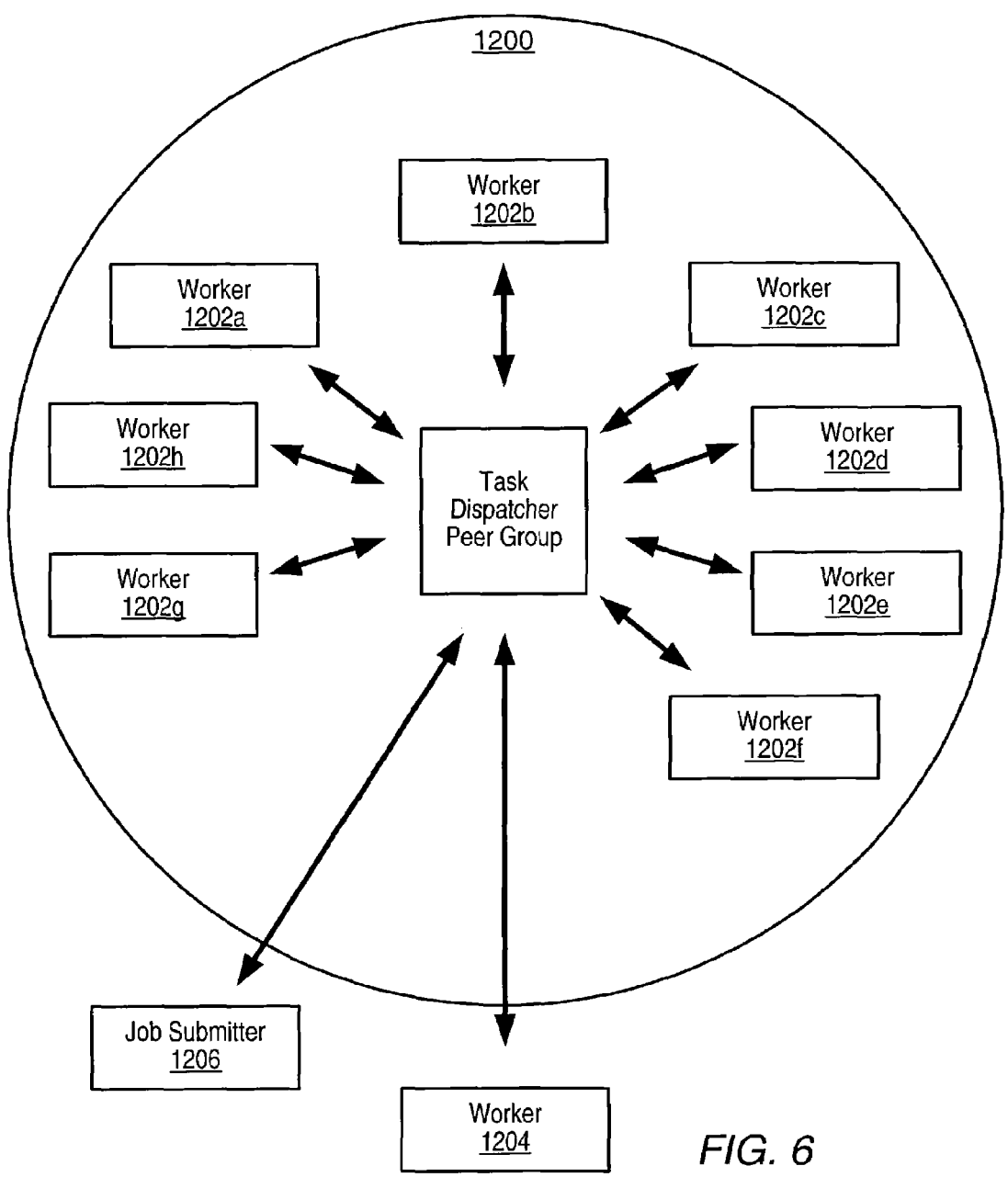
FIG. 6 is a diagram illustrating the interactions between workers, a task dispatcher, and the outside world according to one embodiment.

FIG. 6 is a diagram illustrating the interactions between workers, a task dispatcher peer group, and the outside world according to one embodiment. Peer group 1200 may include peers 1202a-1202g, which may exchange messages with each other. In one embodiment, communication with the "outside world" is preferably only necessary when a peer outside of the work group desires to establish communication with the task dispatcher peer group. For example, a worker 1204 may want to join the work group. As another example, a job submitter 1206 may want to submit a job to the work group.

Once a job has completed, that is, all the tasks in its task repository have completed, the tasks are ready to be sent back to the job submitter. In one embodiment, the task dispatcher may not be required to keep track of the job submitters. In this embodiment, it may be up to the job submitter to initiate the result retrieval process. The job submitter may include a procedure that polls the task dispatcher to determine whether the job that it submitted has completed. Each job may have a job repository, which may have a unique identifier (ID). This unique ID may be sent to the job submitter when the job repository is created, and may be used to request the results. The task dispatcher may relay this request to the repository, which may return the results if the job has completed. These results may be sent back to the job submitter. The job submitter may retrieve the array of tasks and post-processes them, if desired.

Figure 7:
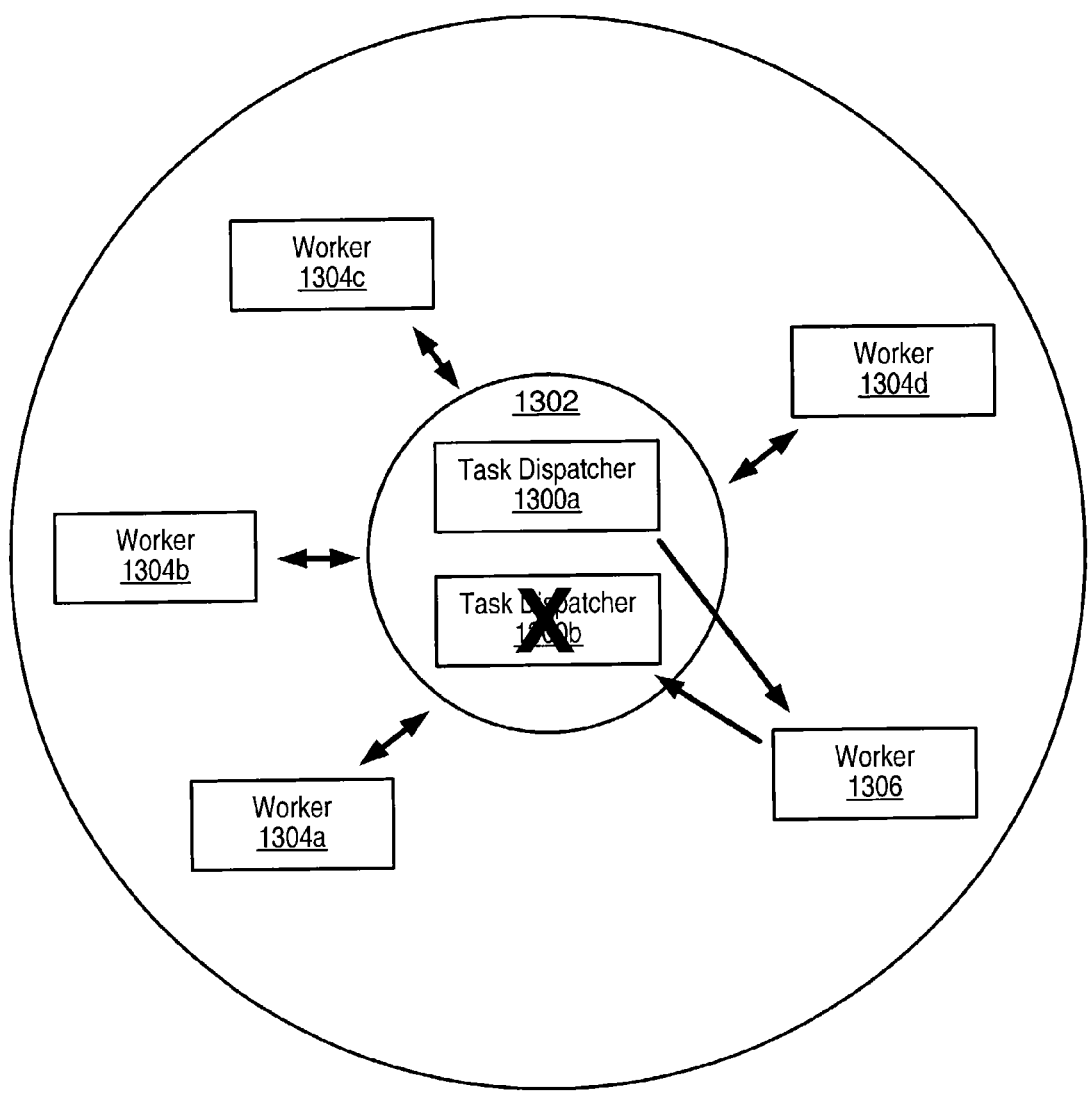
FIG. 7 is a diagram illustrating a worker node assuming the role of task dispatcher according to one embodiment.

FIG. 7 is a diagram illustrating a worker node assuming the role of task dispatcher according to one embodiment. If there was only a single task dispatcher and it was interrupted, all the results from the tasks executed by the workers who sent their results to the task dispatcher would be lost. Therefore, redundant task dispatchers (e.g. task dispatchers 1300a and 1300b) may be included in task dispatcher peer groups 1302. With multiple task dispatchers keeping each other up-to-date with the latest results they have received, the information is not lost if one of the task dispatchers incurs an outage.

In one embodiment, a new worker joining a work group does not contact a particular task dispatcher, but instead contacts the task dispatcher peer group. One of the task dispatchers may then reply to the incoming message. The question of which task dispatcher replies is discussed later in this application. The worker then may establish communication with the task dispatcher. This is illustrated by workers 1304a, 1304b, 1304c, and 1304d. In one embodiment, if a task dispatcher fails to respond to a worker, the worker may back out a level and contact the task dispatcher peer group again. A different task dispatcher may then respond to the worker.

In one embodiment, task dispatchers in a peer group may communicate by sending each other messages, for example at regular time intervals. This regular message exchange may be termed the task dispatcher heartbeat. When a task dispatcher receives new results from a worker, the task dispatcher may send the results to another task dispatcher in the group to maintain a redundant copy of the results. In one embodiment, in order to reduce the communication between task dispatchers, task dispatches may update each other with the newest results only during heartbeats.

In one embodiment, if a task dispatcher 1300a in a peer group realizes that its redundant counterpart (e.g. task dispatcher 1300b) is missing, it may invite a worker 306 requesting a task to execute the task dispatcher code in its peer group, thus transforming a regular worker into a task dispatcher. In one embodiment, both the worker and task dispatcher codes implement a common interface, making them equally schedulable in this mode.

In one embodiment, the number of task dispatchers in the task dispatcher peer group may not be limited to two. Triple or higher redundancy of task dispatchers in the peer group is possible. In one embodiment, because the communication protocols may be applied in a large network, the distributed computing framework may take advantage of the higher reliability offered by having redundant task dispatchers in different geographical regions. By having redundant task dispatchers in different regions, for example, a power outage in one region may not result in loss of information.

As workers are added to a work group, the communication bandwidth between workers and task dispatchers may become a bottleneck. To prevent this, another role may be introduced, the monitor. The main function of the monitor is to intercept requests from peers that do not belong to any peer group yet. Monitors may act as middlemen between work groups and joining peers. Job submitters who want to submit a job and workers who want to join a work group to work on a task may contact a monitor. Monitors free task dispatchers from direct communication with the outside world. Work groups communicate with their monitor and, in one embodiment, do not see the rest of the communication outside of the work group.

A monitor may have several work groups to monitor and may redirect requests from peers from the outside to any of the work groups it monitors. This redirection may depend on the workload of these subgroups. In one embodiment, monitors may participate in monitor peer groups, with several monitors updating each other within a monitor peer group to provide redundancy.

With the addition of monitors, the way jobs are submitted to the framework may be as follows. Job submitters make requests to the monitor peer group. Monitors within the peer group may redirect these requests to a work group. The choice of this group may depend on what code these work groups are already working on, their workloads, etc. The work group may reply directly to the job submitter, which establishes a working relationship with the work group.

The redirection by the top monitor group may happen only once at the initial request by the job submitter to submit a job. Afterwards, messages may be directly sent from the job submitter to the correct work group. A similar protocol may be followed when a new worker wants to join the framework. In addition to redirecting newcomers to the right work groups, the role of the monitors may include monitoring the work groups. In one embodiment, it is up to the monitor to decide to which work group a job should be submitted. The monitor may therefore keep track of work group loads, codes, and information about the loss of task dispatchers in a work group.

In one embodiment, monitors may keep each other up to date with the status of the work groups under them with the monitor group heartbeat. Monitors may also request a worker to become a monitor in case of a monitor failure. If too many peers are present in a work group, the communication bandwidth within that group may become a bottleneck. This may also happen if too many work groups are associated with the same monitor peer group. Therefore, one embodiment may enable a hierarchy of monitor peer groups, with each monitor peer group monitoring a combination of work groups and monitor groups. Whenever a monitor group becomes overloaded, the monitor group may split off a separate monitor group, which takes some of the load off the original monitor group.

Figure 8:
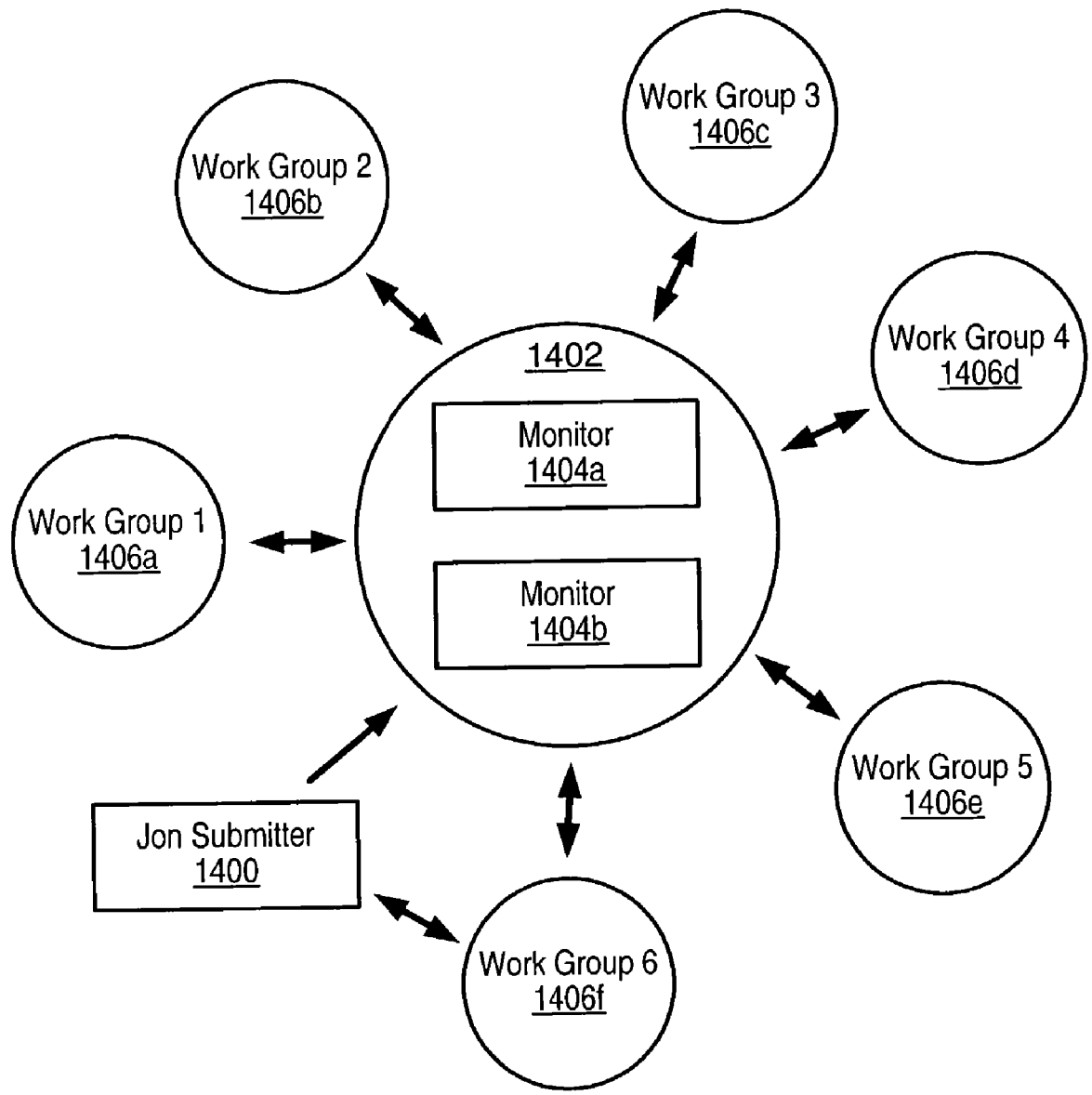
FIG. 8 is a diagram illustrating a mechanism used to submit a job or to request a task from a framework according to one embodiment.

FIG. 8 is a diagram illustrating a mechanism used to submit a job or to request a task from a framework according to one embodiment. The job submitter 1400 or worker contacts the top monitor group 1402. Based on the information passed with the message, one of the peers 1404a and 1404b in the top monitor group may decide which subgroup 406a-406f to hand on the request to, and forward the request to the chosen subgroup. If this subgroup is a monitor group, the message may be forwarded until it reaches a work group. Once the message is in a work group, a task dispatcher in the work group may send a reply to the job submitter/worker. This message may contain the peer ID of the task dispatcher to contact, the ID of the task dispatcher peer group, as well as the peer group IDs of the intermediate peer groups involved in passing down the message. The job submitter/worker at this stage has a point of contact in a new work group. If it fails to contact the task dispatcher, it may successively contact the task dispatcher peer group, its parent, grandparent, etc. until it succeeds in contacting someone in the chain. The last level of the hierarchy is the top-level monitor group.

Because all the new peers joining the framework have to go through the top-level monitor group, the communication at that level might become a bottleneck in the model. In one embodiment, when a new peer contacts the top-level monitor group, all the monitors within this peer group receive the message. Each monitor in the monitor group has a subset of requests to which it replies. These subsets do not overlap and put together compose the entire possible set of requests that exist. Based on a request feature, a single monitor takes the request of the new peer and redirects it to a subgroup.

In one embodiment, monitors may decide whether to reply to a given request based on the request itself coming from the new peer. In this embodiment, there may be no need for communication between monitors to decide who will reply. For example, if there are two monitors in the monitor groups, one monitor could reply to requests from peers having odd peer IDs, while the other monitor could reply to requests from peers having even peer IDs. The decision may not require any communication between the monitors, and thus may reduce the communication needs and increase the bandwidth for other messages. This decision also may be based on the geographical proximity of the requester to the monitor.

Figure 9:
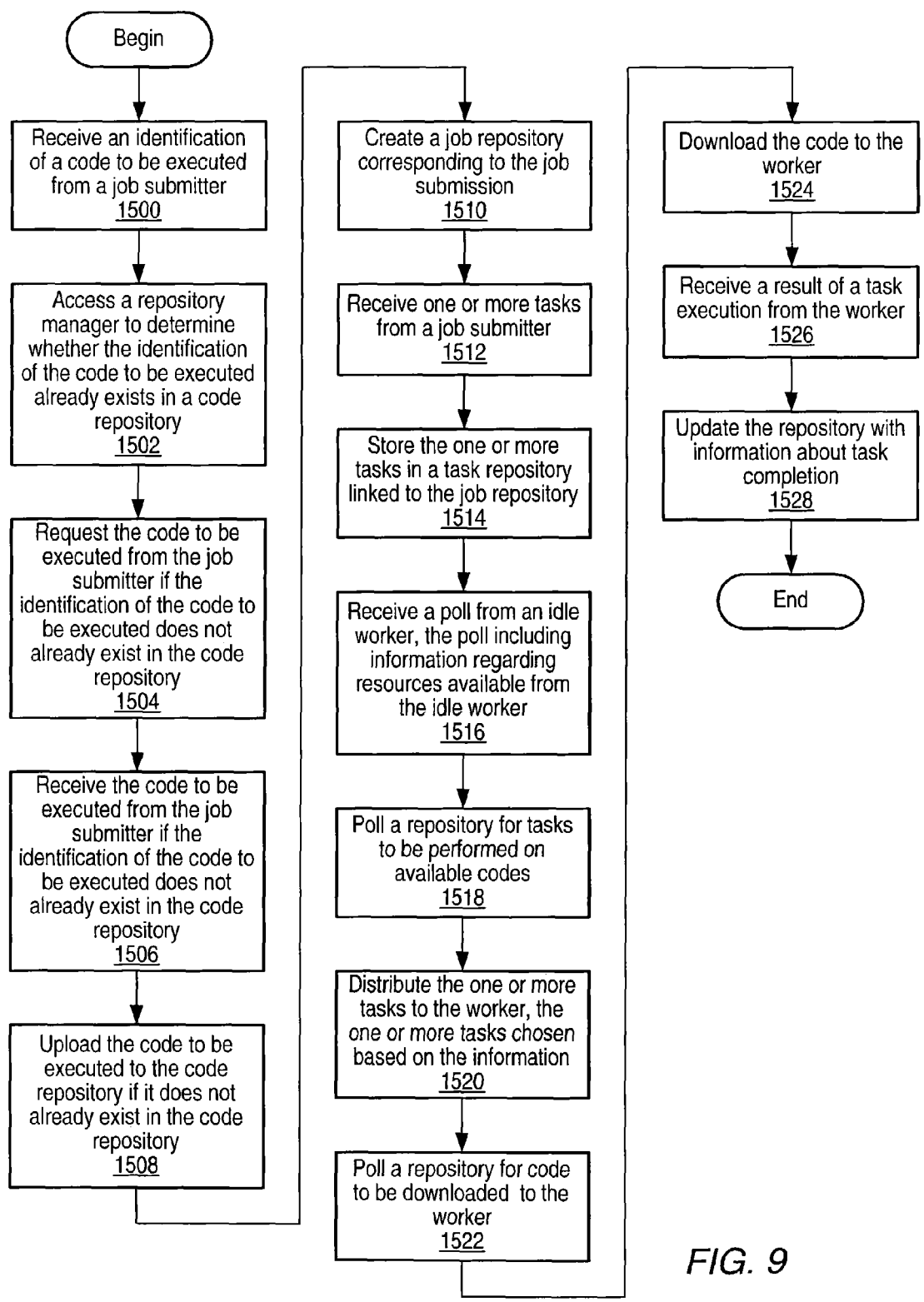
FIG. 9 is a flow diagram illustrating a method for coordinating a job submission in a distributed computing framework according to one embodiment.

FIG. 9 is a flow diagram illustrating a method for coordinating a job submission in a distributed computing framework according to one embodiment. At 1500, an identification of a code to be executed may be received from a job submitter. At 1502, a repository manager may be accessed to determine whether the identification of the code to be executed already exists in a code repository. At 1504, the code to be executed may be requested from the job submitter if the identification of the code to be executed does not already exist in the code repository. At 1506, the code to be executed may be received from the job submitter if, the identification of the code to be executed does not already exist in the code repository. At 1508, the code to be executed may be uploaded to the code repository if it does not already exist in the code repository. At 1510, a job repository corresponding to the job submission may be created. This may be stored on multiple peers. It may also be a part of a repository peer group. At 1512, one or more tasks may be received from a job submitter. At 1514, the one or more tasks may be stored in a task repository linked to the job repository. In one embodiment, the creating and storing may be performed by a repository manager. The receiving an identification, uploading, creating, receiving one or more tasks, and storing may be performed using a peer-to-peer protocol, for example a peer-to-peer protocol of the JXTA platform. At 1516, a poll may be received from an idle worker. In one embodiment, the poll may include information regarding resources available from the idle worker. This information may include information regarding codes cached by the worker. At 1518, a repository may be polled for tasks to be performed on available codes. This may comprise contacting a repository manager. The repository manager may control one or more repositories in a repository peer group. At 1520, one or more of the tasks may be distributed to the worker; the one or more tasks may be chosen based on the information. At 1522, a repository may be polled for code to be downloaded to the worker. At 1524, the code may be downloaded to the worker. At 1526, a result of a task execution may be received from the worker. At 1528, the repository may be updated with information about task completion. The receiving a poll, polling a repository, distributing, receiving a result, and updating may be performed using a peer-to-peer protocol, for example a peer-to-peer protocol of the JXTA platform.

Figure 10:
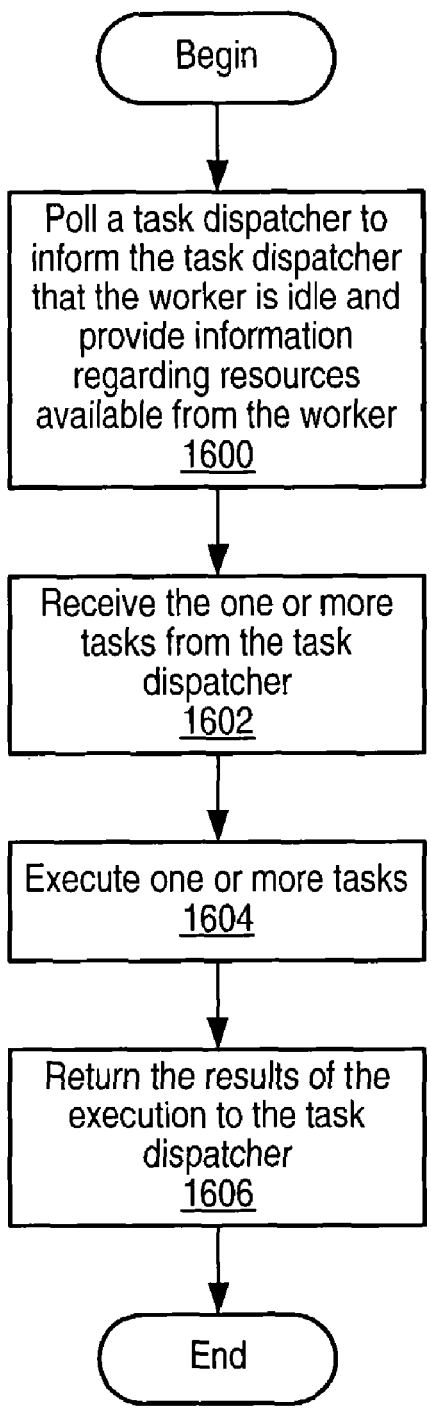
FIG. 10 is a flow diagram illustrating a method for coordinating execution of a task by an idle worker in a distributed computing framework according to one embodiment.

FIG. 10 is a flow diagram illustrating a method for coordinating execution of a task by an idle worker in a distributed computing framework according to one embodiment. At 1600, a task dispatcher may be polled to inform the task dispatcher that the worker is idle and provide information regarding resources available from the worker. This information may include information regarding codes cached by the worker. At 1602, the one or more tasks may be received from the task dispatcher. The task dispatcher may be a task dispatcher manager. This may be a task dispatcher that controls one or more task dispatchers in a peer group. At 1604, the one or more tasks may be executed. At 1606, the results of the execution may be returned to the task dispatcher. The polling, receiving, and returning may be performed using a peer-to-peer protocol, for example a peer-to-peer protocol of the JXTA platform.

Figure 11:
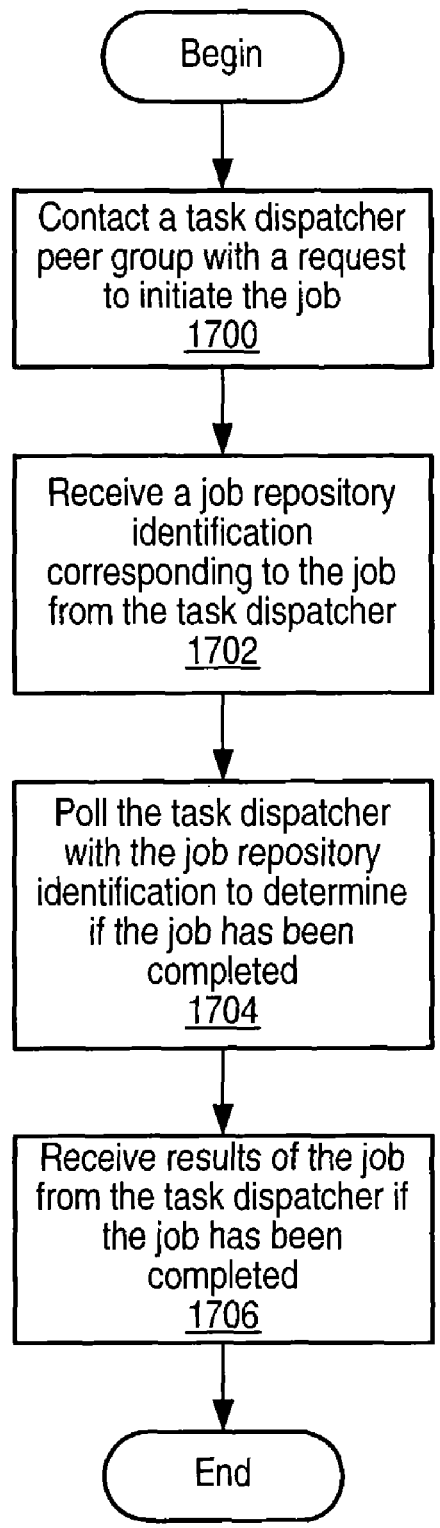
FIG. 11 is a flow diagram illustrating a method for submitting a job to a distributed computing environment according to one embodiment.

FIG. 11 is a flow diagram illustrating a method for submitting a job to a distributed computing environment according to one embodiment. At 1700, a task dispatcher peer group may be contacted with a request to initiate the job. A task dispatcher in the task dispatcher peer group may handle the request. This task dispatcher may be a task dispatcher manager that controls one or more task dispatchers in a task dispatcher peer group. At 1702, a job repository identification corresponding to the job may be received from the task dispatcher. At 1704, the task dispatcher may be polled with the job repository identification to determine if the job has been completed. At 1706, results of the job may be received from the task dispatcher if the job has been completed. The contacting, receiving a job repository identification, polling, and receiving results may be performed using a peer-to-peer protocol, for example a peer-to-peer protocol of the JXTA platform.

FIG. 12 is a flow diagram illustrating a method for submitting a job to a distributed computing environment according to one embodiment. At 1800, a monitor peer group may be contacted with a request to initiate the job. The monitor may relay this request to a task dispatcher in its choice of workgroup. At 1802, a job repository identification corresponding to the job may be received from the task dispatcher. The task dispatcher may be a task dispatcher manager that controls one or more task dispatchers in a task dispatcher peer group. At 1804, the task dispatcher may be polled with the job repository identification to determine if the job has been completed. At 1806, results of the job may be received from the task dispatcher if the job has been completed. The contacting, receiving a job repository identification, polling, and receiving results may be performed using a peer-to-peer protocol, for example a peer-to-peer protocol of the JXTA platform.

FIG. 13 is a flow diagram illustrating a method for adding a worker to a work group according to one embodiment. At 1900, a join request may be received from a worker. At 1902, the join request may be forwarded to a work group; the work group may be determined, for example, by examining workload of two or more work groups. At 1904, a heartbeat is transmitted to the work groups to receive status regarding work group loads, codes, and information about the loss of task dispatchers.

Figure 14:
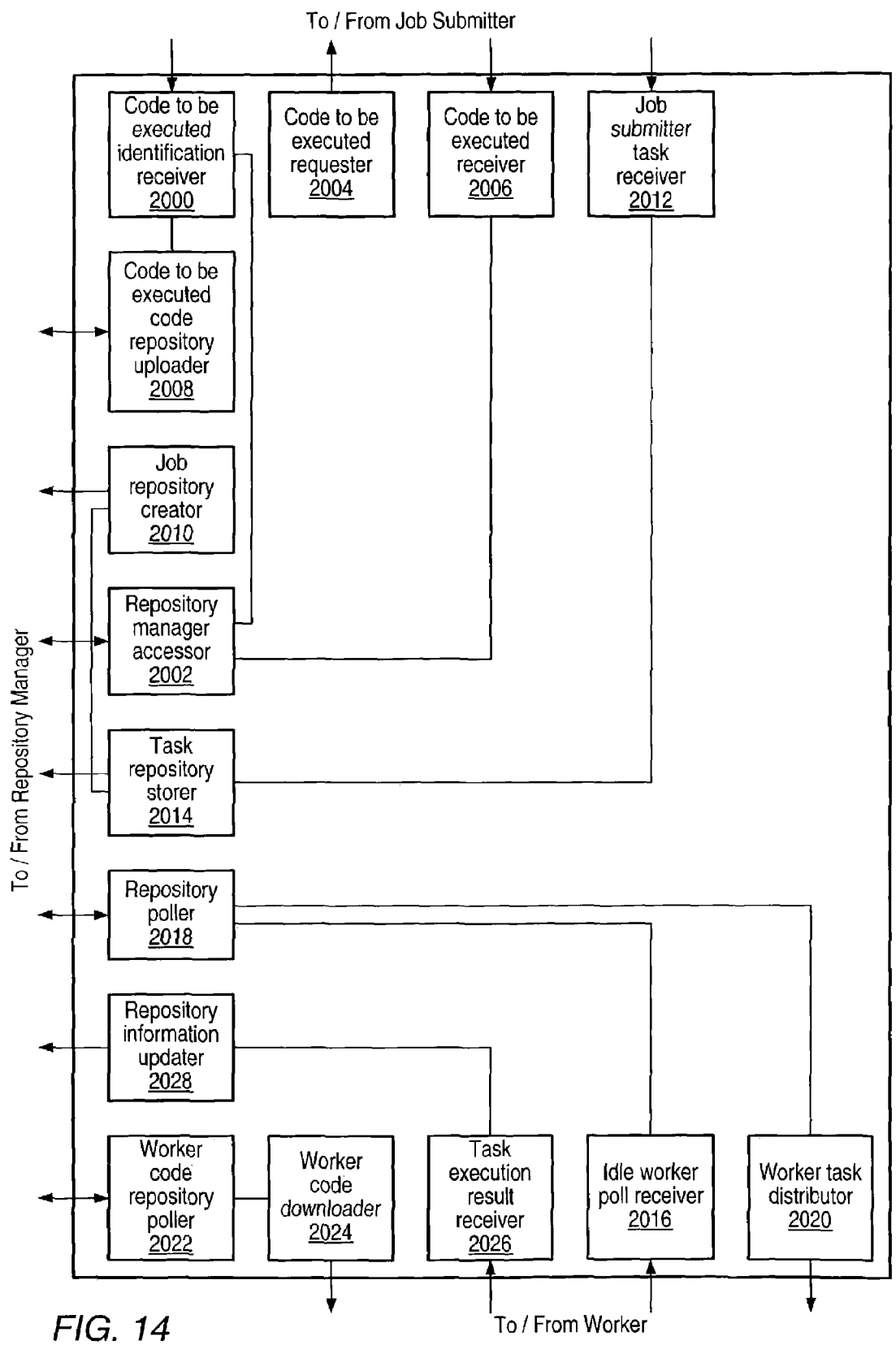
FIG. 14 is a block diagram illustrating an apparatus for coordinating a job submission in a distributed computing framework according to one embodiment.

FIG. 14 is a block diagram illustrating an apparatus for coordinating a job submission in a distributed computing framework according to one embodiment. A code to be executed identification receiver 2000 may receive an identification of a code to be executed from a job submitter. A repository manager accesser 2002 coupled to the code to be executed identification receiver 2000 may access a repository manager to determine whether the identification of the code to be executed already exists in a code repository. A code to be executed requester 2004 coupled to the repository manager accesser 2002 may request the code to be executed from the job submitter if the identification of the code to be executed does not already exist in the code repository. A code to be executed receiver 2006 may then receive the code to be executed from the job submitter if the identification oft he code to be executed does not already exist in the code repository. A code to be executed code repository uploader 2008 coupled to the code to be executed identification receiver 2000 and to the code to be executed receiver 2006 may upload the code to be executed to the code repository if it does not already exist in the code repository. A job repository creator 2010 coupled to the code to be executed identification receiver 2000 may create a job repository corresponding to the job submission. In one embodiment, the job repository may be stored on multiple peers. In one embodiment, the job repository may be a part of a repository peer group. A job submitter task receiver 2012 may receive one or more tasks from a job submitter. A task repository storer 2014 coupled to the job submitter task receiver 2012 and to the job repository creator 2010 may store the one or more tasks in a task repository linked to the job repository. In one embodiment, the creating and storing may be performed by a repository manager. The receiving an identification, uploading, creating, receiving one or more tasks, and storing may be performed using a peer-to-peer protocol, for example a peer-to-peer protocol of the JXTA platform.

An idle worker poll receiver 2016 may receive a poll from an idle worker. In one embodiment, the poll may include information regarding resources available from the idle worker. This information may include information regarding codes cached by the worker. A repository poller 2018 coupled to the idle worker poll receiver 2016 may poll a repository for tasks to be performed on available codes. This may comprise contacting a repository manager. The repository manager may control one or more repositories in a repository peer group. A worker task distributor 2020 coupled to the repository poller 2018 may distribute one or more of the tasks to the worker, the one or more tasks chosen based on the information. A worker code repository poller 2022 may poll a repository for code to be downloaded to the worker. A worker code downloader 2024 coupled to the worker code repository poller 2012 may download the code to the worker. A task execution result receiver 2026 may receive a result of a task execution from the worker. A repository information updater 2028 coupled to the task execution result receiver 2026 may update the repository with information about task completion. The receiving a poll, polling a repository, distributing, receiving a result, and updating may be performed using a peer-to-peer protocol, for example a peer-to-peer protocol of the JXTA platform.

Figure 15:
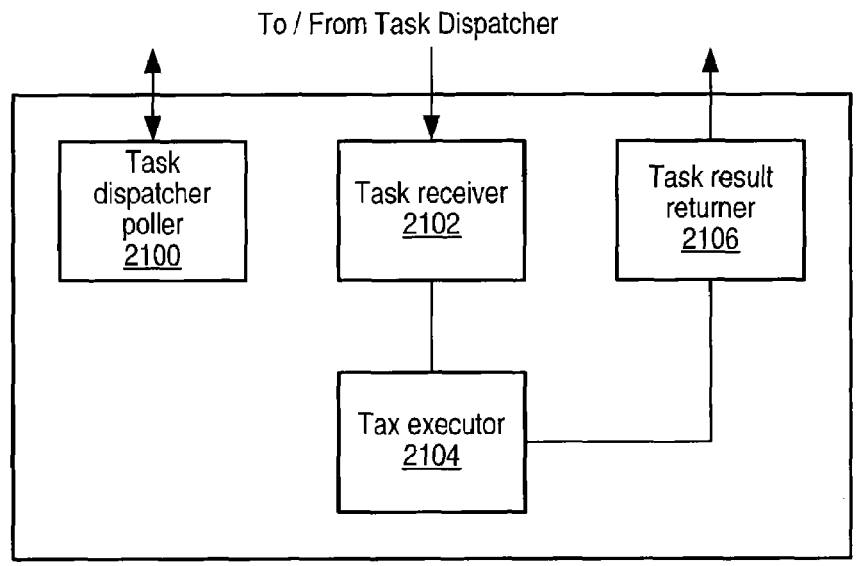
FIG. 15 is a block diagram illustrating an apparatus for coordinating execution of a task by an idle worker in a distributed computing framework according to one embodiment.

FIG. 15 is a block diagram illustrating an apparatus for coordinating execution of a task by an idle worker in a distributed computing framework according to one embodiment. A task dispatcher poller 2100 may poll a task dispatcher to inform the task dispatcher that the worker is idle and provide information regarding resources available from the worker. This information may include information regarding codes cached by the worker. A task receiver 2102 may receive the one or more tasks from the task dispatcher. The task dispatcher may be a task dispatcher manager. This may be a task dispatcher that controls one or more task dispatchers in a peer group. A task executor 2104 coupled to the task receiver 2102 may execute the one or more tasks. An execution result returner 2106 coupled to the task executor 2104 may return the results of the execution to the task dispatcher. The polling, receiving, and returning may be performed using a peer-to-peer protocol, for example a peer-to-peer protocol of the JXTA platform.

Figure 16:
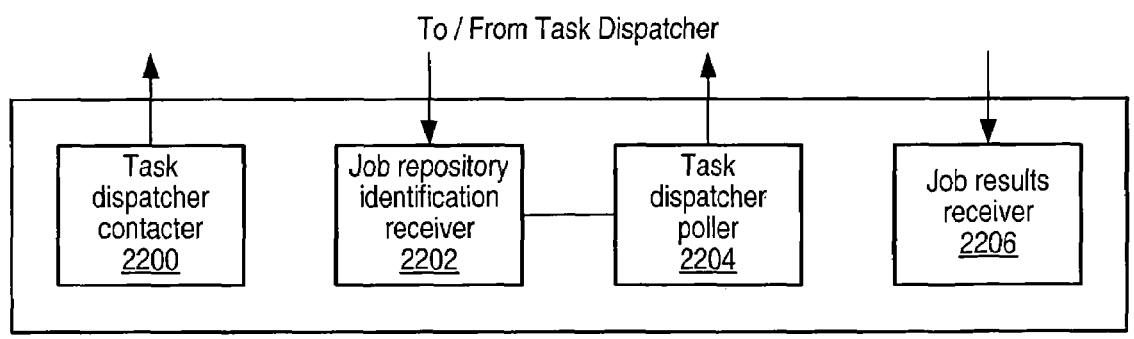
FIG. 16 is a block diagram illustrating an apparatus for submitting a job to a distributed computing environment according to one embodiment.

FIG. 16 is a block diagram illustrating an apparatus for submitting a job to a distributed computing environment according to one embodiment. A task dispatcher contactor 2200 may contact a task dispatcher with a request to initiate the job. The task dispatcher may be a task dispatcher manager that controls one or more task dispatchers in a task dispatcher peer group. A job repository identification receiver 2202 may receive a job repository identification corresponding to the job from the task dispatcher. A task dispatcher poller 2204 coupled to the job repository identification receiver 2202 may poll the task dispatcher with the job repository identification to determine if the job has been completed. A job results receiver 2206 may receive results of the job from the task dispatcher if the job has been completed. The contacting, receiving a job repository identification, polling, and receiving results may be performed using a peer-to-peer protocol, for example a peer-to-peer protocol of the JXTA platform.

Figure 17:
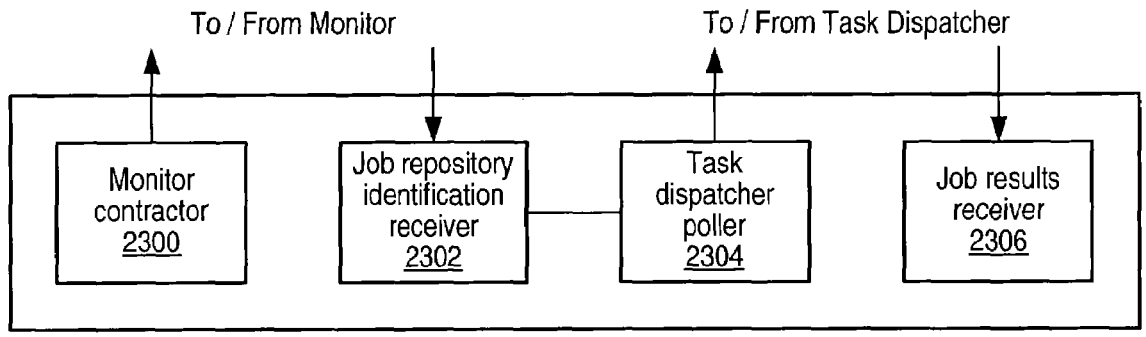
FIG. 17 is a block diagram illustrating an apparatus for submitting a job to a distributed computing environment according to one embodiment.

FIG. 17 is a block diagram illustrating an apparatus for submitting a job to a distributed computing environment according to one embodiment. A monitor contactor 2300 may contact a monitor with a request to initiate the job. A job repository identification receiver 2302 may, receive a job repository identification corresponding to the job from the monitor as well as task dispatcher information. The task dispatcher may be a task dispatcher manager that controls one or more task dispatchers in a task dispatcher peer group. A task dispatcher poller 2304 coupled to the job repository identification receiver 2302 may poll the task dispatcher with the job repository identification to determine if the job has been completed. A job results receiver 2306 may receive results of the job from the task dispatcher if the job has been completed. The contacting, receiving a job repository identification, polling, and receiving results may be performed using a peer-to-peer protocol, for example a peer-to-peer protocol of the JXTA platform.

Figure 18:
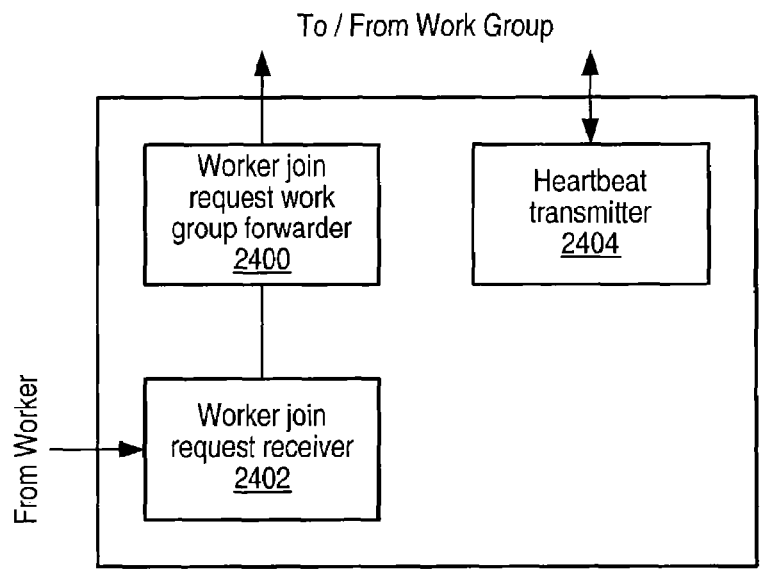
FIG. 18 is a block diagram illustrating an apparatus for adding a worker to a work group according to one embodiment.

FIG. 18 is a block diagram illustrating an apparatus for adding a worker to a work group according to one embodiment. A worker join request receiver 2400 may receive a join request from a worker. A worker join request work group forwarder 2402 coupled to the worker join request receiver 2400 may forward the join request to a work group. In one embodiment, the work group may be determined by examining workload of two or more work groups. A heartbeat transmitter 2404 may transmit a heartbeat to the work groups to receive status regarding work group loads, codes, and information about the loss of task dispatchers.

Distributed Computing Mechanism

Embodiments of a system and method for submitting and performing computational tasks in a distributed heterogeneous networked environment (which, for simplicity, may be referred to as the distributed computing mechanism) are described. Embodiments may allow tasks to be submitted by users and run in parallel on a network of heterogeneous computers implementing a variety of operating environments (e.g. UNIX-based environments, PC-based systems, cell phones, etc.). One embodiment enables users (e.g. software developers) to submit tasks to a cluster or group of peer nodes participating in a peer-to-peer environment on a network. In one embodiment, tasks may preferably be submitted to the cluster or group for execution from any peer node (or, in one embodiment, any other node) connected to the network. Embodiments of the remote class loader mechanism may be used in embodiments of the exemplary distributed computing mechanism to dynamically load remote classes on a node using a default class loader and without requiring a custom class loader.

A peer node may manifest in the form of a processor, a process or a device. A peer node may be anything with a digital heartbeat including sensors, servers, PCs, computers up to and including supercomputers, PDAs, manufacturing, and medical equipment, phones and cellular phones. A peer node may also be referred to as a "peer." In order to interact with other peer nodes (e.g. to form or join peer groups), the peer node needs to be connected to some kind of network (wired or wireless), such as IP, Bluetooth, or Havi, among others. In one embodiment, the peer nodes may participate in a peer-to-peer environment implemented in accordance with a peer-to-peer platform. One example of such a peer-to-peer platform is the JXTA platform. In one embodiment, the peer nodes may participate in a distributed computing framework such as the exemplary distributed computing framework described above to implement the system and method for submitting and performing computational tasks in a distributed heterogeneous networked environment. It is important to note that the distributed computing framework described above is exemplary and that other distributed computing frameworks may also be used.

In one embodiment, a user on an originating node (the node may be a peer node or other node on the network) may identify code that may be run in parallel. In one embodiment, the code may be advertised on the network, for example using a broadcast advertisement. In one embodiment, advertisements such as those of the JXTA platform may be used to advertise code on the network. Other embodiments may use other methods to advertise code on the network. Peer nodes that receive the advertisement and that are willing to participate may request the code. The code may be sent to the one or more (local or remote) peer nodes that respond positively to the advertisement. In one embodiment, once the code is received by a peer node, the code may be stored locally. In one embodiment, the peer nodes that receive the code may participate in a peer group, such as a peer group of the JXTA platform. In one embodiment, the peer nodes that receive the code may participate in one or more peer groups such as the peer groups described for the exemplary distributed computing framework described above.

The user may split work to be executed by the code distributed to the peer nodes into separate tasks. These tasks may be advertised on the network, for example using a broadcast advertisement. In one embodiment, advertisements such as those of the JXTA platform may be used to advertise tasks on the network. Other embodiments may use other methods to advertise tasks on the network. Tasks may be sent to peer nodes that request them. Typically, these peers will be the same as the ones responding to the code advertisements, but other peer nodes than those that requested and received the code may respond and request tasks. This may happen, for example, if a peer node that requested the code is disconnected from the network. It may also happen if new peer nodes join the network and requests the code previously advertised to join the group of peer nodes that have previously received the code.

In one embodiment, communication between peer nodes may be implemented according to a peer-to-peer protocol that enables the establishment of communications channels between two peers or among a plurality of peers. In one embodiment, one or more of the peer-to-peer platform protocols of the JXTA platform may be used for communication between peer nodes. Other embodiments may use other peer-to-peer protocols for communication between peer nodes, including peer-to-peer protocols of other peer-to-peer platforms than the JXTA platform. In one embodiment, some information (e.g. the code and/or tasks) may be transferred via a network communications protocol such as HTTP. It is important to note that other protocols may be used for communications between peers and/or for information transfer than those protocols described herein.

The peer nodes may then work on the tasks that they requested. Once a peer node's work on a task is completed, the peer node may send the results of the task back to the originating node. The peer node may then request additional tasks. In one embodiment, if a peer node is interrupted during execution, the task may be readvertised, and other peer nodes may request the task. When tasks are completed, the user on the originating node may retrieve and process the results of the tasks.

Embodiments may use one or more protocols for establishment of connections between peer nodes (e.g. the JXTA platform protocols) and information transfer (e.g. network communication protocols such as HTTP) that are available on a variety of operating environments. Using these protocols, embodiments may not be intrinsically limited to submitting tasks to a limited subset of peer nodes. In one embodiment, the code may be written in a bytecode-level language recognized by all or a subset of the peer nodes in the network (e.g. the Java programming language). In this embodiment, peer nodes with virtual machines able to interpret this bytecode-level language may participate in the computations. In one embodiment, the format used in the code may not be known by at least some peer nodes in the network. In this case, only a subset of the peer nodes that desire to work may request the code and work on tasks related to it. The advertisement may reach all of the peer nodes, and peer nodes may request the code if they are supporting the code format and desire to work with the code.

One embodiment may transfer code over the network via an information transfer protocol (e.g. HTTP). The bytecode or binaries required for code execution may be loaded by the job submitter and sent over the network to other peer nodes using the information transfer protocol. A receiving (local or remote) peer node may save the bytecode/binaries locally and load them dynamically to run tasks that may be subsequently requested. In one embodiment, the entire code is transferred from the job submitter to the peer node, and the peer node may not need to load anything more from the job submitter.

One embodiment may use a protocol that provides a mechanism for a peer node behind a firewall to cross the firewall to access data outside the firewall. One embodiment may use a protocol that provides a mechanism for a peer node behind a firewall to cross the firewall to access data outside the firewall using relay peers, such as embodiments of the mechanism and relay peers provided by the JXTA platform. The relay peers may be used, for example, to contact peer nodes outside the firewall domain.

Figure 19A:
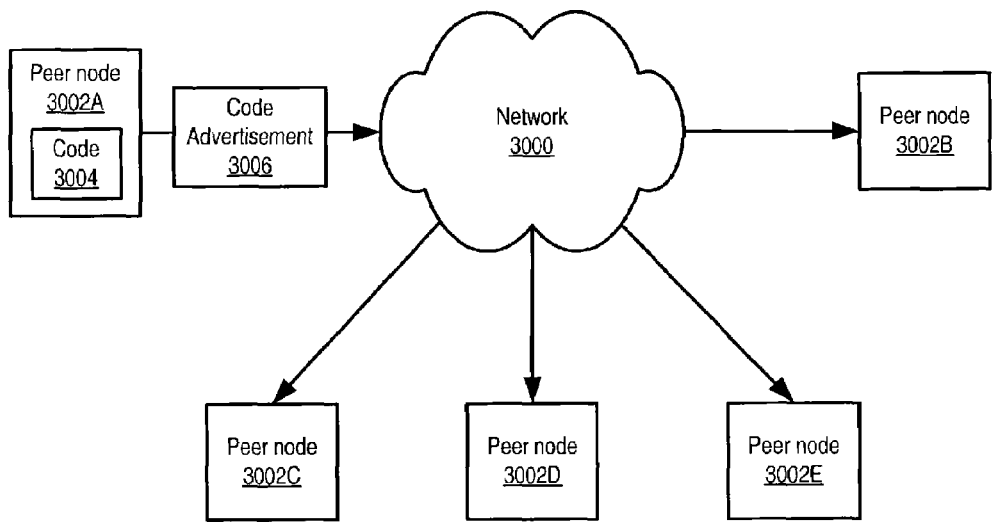
FIGS. 19A-19E illustrate submitting and performing computational tasks in a distributed heterogeneous networked environment according to one embodiment.

FIGS. 19A-19E illustrate submitting and performing computational tasks in a distributed heterogeneous networked environment according to one embodiment. In one embodiment, the mechanism illustrated in FIGS. 19A-19E may be implemented and performed according to the exemplary distributed computing framework described above. In FIG. 19A, peer node 3002A may have generated computer-executable code 3004. The code may be configured to run a plurality of tasks in parallel on two or more peer nodes 3002 on the network 3000 to perform a job. In one embodiment, the code 3004 may be programmed in a bytecode language. In one embodiment, the bytecode language may be the Java programming language.

In one embodiment, peer node 3002A may broadcast an advertisement for the code 3004 on the network 3000. Other embodiments may use other mechanisms to advertise the code 3004 on the network. In one embodiment, the code 3004 may be advertised using one or more advertisement mechanisms such as those of the JXTA platform, and advertising the code may be performed using one or more peer-to-peer platform (e.g. JXTA) protocols. In one embodiment, the code may be advertised according to the exemplary distributed computing framework described above. It is important to note that code may be generated on and advertised from any peer node 3002 (or, in one embodiment, any node) coupled to network 3000. In other words, peer node 3002A may represent any node coupled to network 3000.

Any or all peer nodes 3002 coupled to network 3000 may receive the code advertisement 3006. In this example, peer nodes 3002B-3002E may receive code advertisement 3006. In one embodiment, the code advertisement 3006 may be received using one or more advertisement mechanisms such as those of the JXTA platform. In one embodiment, one or more of peer nodes 3002B-3002E may be on opposite sides of a firewall or firewalls from peer node 3002A.

One or more of the peer nodes 3002 that receive the code advertisement 3006 may respond to the code advertisement 3006, if desired. In one embodiment, peer nodes 3002 that are configured to execute the computer language in which the code 3004 is implemented may respond to the code advertisement 3006. In one embodiment, responding peer nodes 3002 may implement containers (e.g. Java Virtual Machines (JVMs)) in which the code 3004 may be executed. In one embodiment, peer nodes 3002 may respond to the code advertisement 3006 by sending a response message requesting the code 3004 to peer node 3002A. In one embodiment, peer nodes 3002 may respond to the code advertisement 3006 using one or more peer-to-peer platform protocols, such as the peer-to-peer platform protocols of the JXTA platform. In one embodiment, code advertisement 3006 may include information configured for use in responding to the code advertisement 3006. In this example, peer nodes 3002C-3002E may respond to the code advertisement 3006, and peer node 3002B may not respond to the code advertisement.

Figure 19B:
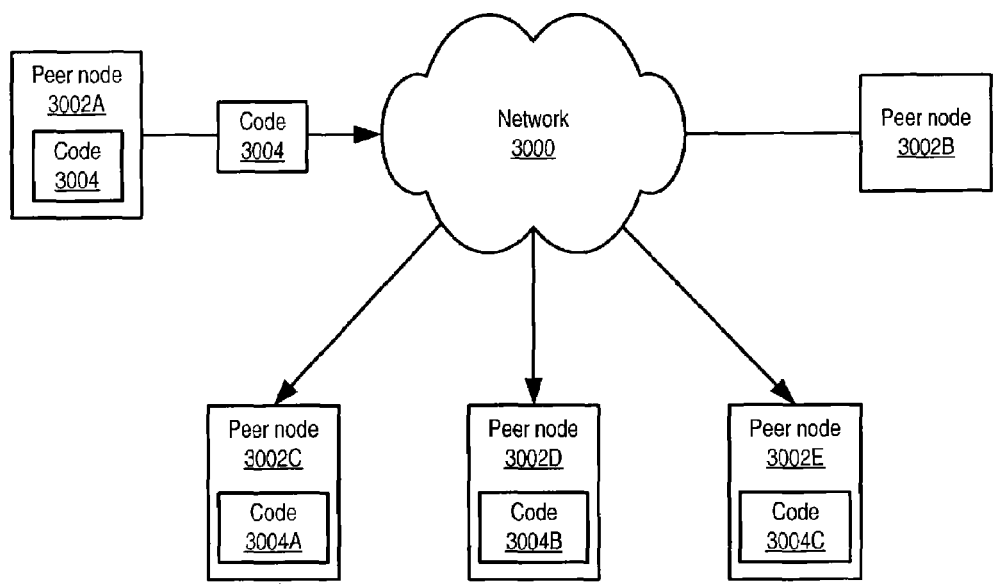

In FIG. 19B, peer node 3002A may provide code 3004 to one or more peer nodes 3004 that respond to the code advertisement 3006. In this example, peer node 3002A may provide code 3004 to peer nodes 3002C-3002E. In one embodiment, to provide code 3004 to a peer node 3002, peer node 3002A may transmit the code 3004 to the peer node 3002 according to a network information transfer protocol. In one embodiment, the network information transfer protocol may be HTTP. Other embodiments may use other network information transfer protocols to transmit code 3004. After peer node 3002A provides code 3004 to peer nodes 3002C-3002E, each of the peer nodes 3002 that received the code 3004 may include a copy of code 3004. In one embodiment, a peer node 3002 that receives the code 3004 may store the code 3004 to a local storage, e.g. a disk device or other non-volatile storage. In this example, peer node 3002C includes copy of code 3004A, peer node 3002D includes copy of code 3004B, and peer node 3002E includes copy of code 3004C.

Figure 19C:
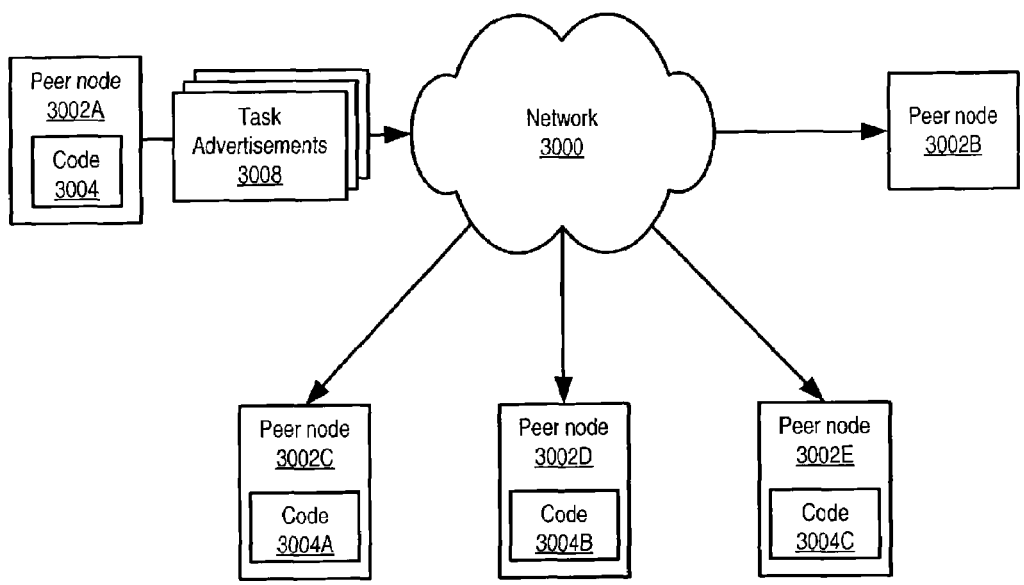

In FIG. 19C, peer node 3002A may partition a job to be performed by code 3004 into a plurality of tasks. In one embodiment, peer node 3002A may broadcast one or more advertisements for the tasks 3008 on the network 3000. In one embodiment, there may be one task advertisement 3008 for each task. Other embodiments may use other mechanisms to advertise the tasks on the network. In one embodiment, the tasks may be advertised using one or more advertisement mechanisms such as those of the JXTA platform, and advertising the tasks may be performed using one or more peer-to-peer platform (e.g. JXTA) protocols. In one embodiment, the tasks may be advertised according to the exemplary distributed computing framework described above.

One or more of the peer nodes 3002 that receive the task advertisement(s) 3008 may respond to the task advertisement (s) 3008, if desired. In one embodiment, peer nodes 3002 may respond to the task advertisement(s) 3008 by sending a response message requesting a task to peer node 3002A. In one embodiment, peer nodes 3002 may respond to the task advertisement(s) 3008 using one or more peer-to-peer platform protocols, such as the peer-to-peer platform protocols of the JXTA platform. In one embodiment, task advertisement (s) 3008 may include information configured for use in responding to the task advertisement(s) 3008. In this example, peer nodes 3002C-3002E may respond to the task advertisement(s) 3008, and peer node 3002B may not respond to the task advertisement(s). Note that, in one embodiment, peer node 3002B or other peer nodes 3002 on the network 3000 may respond to the task advertisement(s) 3008 even if the peer node did not respond to the code advertisement 3006 and/or did not receive code 3004 from peer node 3002A. In one embodiment, if a peer node 3002 (e.g. peer node 3002B) that has not received code 3004 responds to the task advertisement(s) 3008, peer node 3002A may choose to provide code 3004 to the peer node 3002 so that the peer node 3002 may execute one or more tasks as assigned.

Figure 19D:
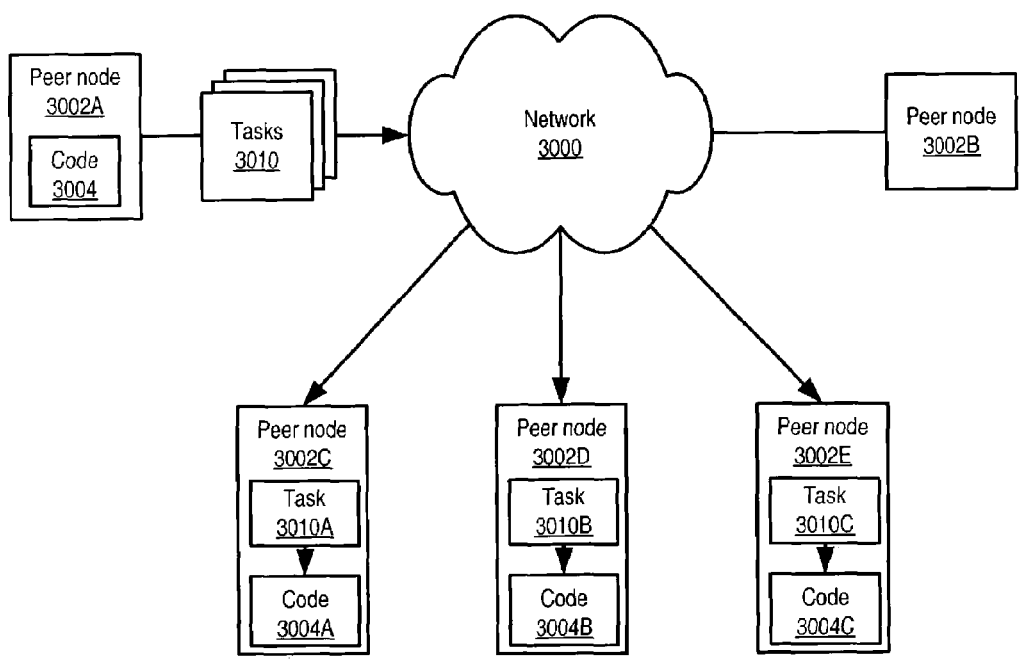
Figure 19E:
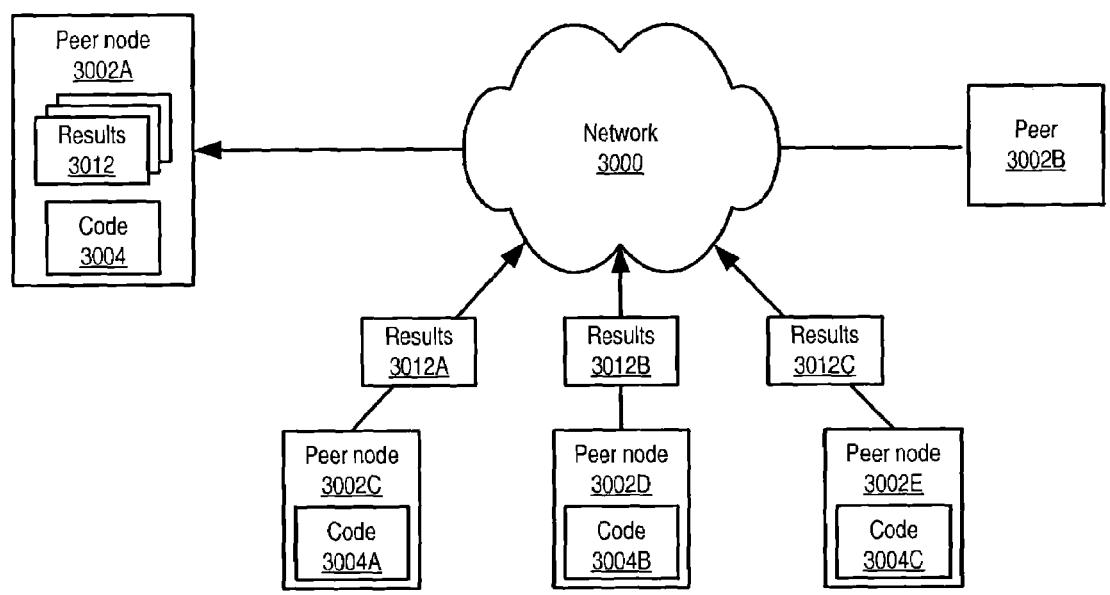

In FIG. 19D, peer node 3002A may assign a different task 3010 to one or more of the peer nodes 3002 that respond to task advertisement 3008. In one embodiment, assigning a task 3010 to a particular peer node 3002 may include sending a message to the peer node indicating the particular task 3010 to be performed by the peer node 3002. In one embodiment, the message may include one or more parameters indicating the particular task 3010 to be performed by the peer node 3002. Each peer node 3002 receiving a task assignment may receive different values for the parameters to indicate the particular task 3010 to be performed by the peer node 3010. In this example, peer node 3002C is assigned task 3010A, peer node 3002D is assigned task 3010B, and peer node 3002E is assigned task 3010C. In one embodiment, the tasks may be assigned according to the exemplary distributed computing framework described above. In one embodiment, task assignments may be transmitted to peer nodes 3002 according to a network information transfer protocol. In one embodiment, the network information transfer protocol may be HTTP.

Peer nodes 3002 assigned tasks 3010 may then execute the assigned tasks 3010 according to code 3004. In one embodiment, a peer node 3002 may dynamically load a portion or all of stored code 3004 into execution memory (e.g. RAM) to perform its assigned task 3010. In this example, peer node 3002C may execute task 3010A, peer node 3002D may execute task 3010B, and peer node 3002E may execute task 3010C. Note that peer nodes 3002 may execute the tasks 3010 in parallel. Each task may be executed according to code 3004 to perform a particular portion of the job that peer node 3002A desires to execute using the distributed computing mechanism described herein. In one embodiment, the tasks may be executed according to the exemplary distributed computing framework described above.

As each peer node 3002 completes its assigned task 3010, the peer node 3002 may return results of the task 3010 to peer node 3002A. In this example, peer node 3002C may return results 3012A of task 3010A to peer node 3002A when task 3010A completes, peer node 3002D may return results 3012B of task 3010B to peer node 3002A when task 3010B completes, and peer node 3002E may return results 3012C of task 3010C to peer node 3002A when task 3010C completes. In one embodiment, results may be transmitted to peer node 3002A according to a network information transfer protocol. In one embodiment, the network information transfer protocol may be HTTP. In one embodiment, the results may be returned to peer node 3002A according to the exemplary distributed computing framework described above.

If there are more tasks to be performed, a peer node 3002 that completes a task 3010 may receive another task assignment from peer node 3002A. In one embodiment, a peer node 3002 that completes a task 3010 may send a message to peer node 3002 requesting another task assignment, if any are available. Peer nodes 3002 may continue receiving task assignments and executing tasks 3010 until all tasks 3010 for the job are completed. Peer node 3002A may store results 3012 of completed tasks 3010 until all tasks 3010 of the job are completed. Peer node 3002A may then post-process results 3012 of the completed job, if desired. Note that peer node 3002A or any other peer node 3002 may advertise other codes 3004 to perform other jobs on the network before, during or after the running of a job. In other words, more than one job may be in various stages of performance, as illustrated in FIGS. 19A-19E, at any one time. In one embodiment, a peer node 3002 may include more than one code 3004 configured to execute tasks for different jobs, and may request and be assigned more than one task 3010 from one job, or even tasks 3010 from more than one job, at a time.

Figure 20:
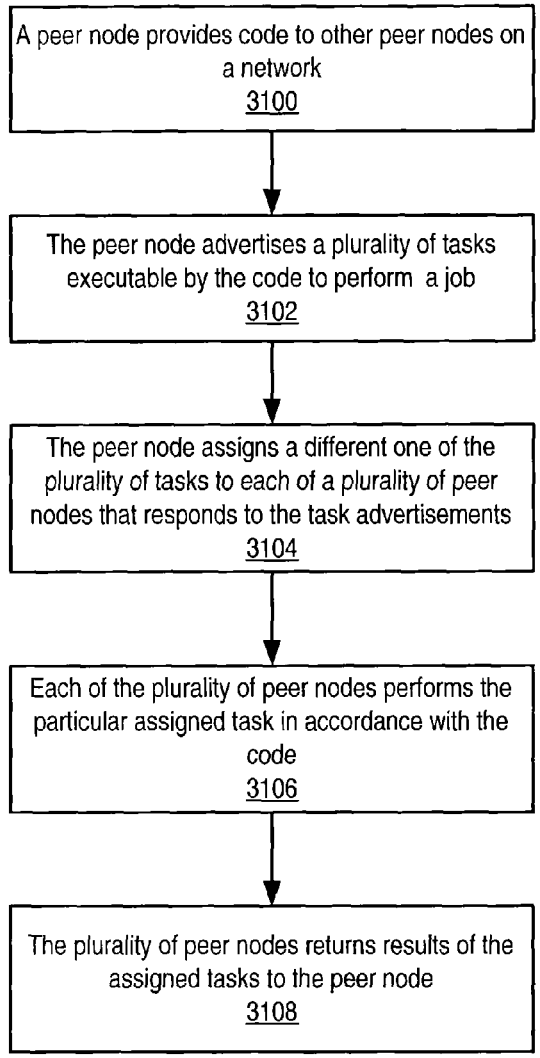
FIG. 20 is a flowchart illustrating a method of submitting and performing computational tasks in a distributed heterogeneous networked environment according to one embodiment.

FIG. 20 is a flowchart illustrating a method of submitting and performing computational tasks in a distributed heterogeneous networked environment according to one embodiment. The method illustrated in FIG. 20 illustrates means for the distributed computing mechanism to advertise a plurality of tasks on the network, to assign a different one of the plurality of tasks to each of a group of peer nodes that responds to the task advertisement(s), and means for executing the plurality of tasks in parallel on the group of peer nodes to perform a job. In one embodiment, the method illustrated in FIG. 20 may be implemented and performed according to the exemplary distributed computing framework described above. A peer node on a network may have generated computer-executable code configured to run a plurality of tasks in parallel on two or more peer nodes on the network to perform a job. In one embodiment, the code may be programmed in a bytecode language. In one embodiment, the bytecode language may be the Java programming language. As indicated at 3100, a peer node may provide the code to two or more other peer nodes on the network.

The peer node may partition a job to be performed by the provided code into a plurality of tasks. As indicated at 3012, the peer node may advertise the plurality of tasks executable by the code to perform the job. In one embodiment, the peer node may broadcast one or more advertisements for the tasks on the network. In one embodiment, there may be one task advertisement for each task. Other embodiments may use other mechanisms to advertise the tasks on the network. In one embodiment, the tasks may be advertised using one or more advertisement mechanisms such as those of the JXTA platform, and advertising the tasks may be performed using one or more peer-to-peer platform (e.g. JXTA) protocols. In one embodiment, the tasks may be advertised according to the exemplary distributed computing framework described above.

One or more of the peer nodes that receive the task advertisement(s) may respond to the task advertisement(s), if desired. In one embodiment, peer nodes may respond to the task advertisement(s) by sending a response message requesting a task to the peer node. In one embodiment, peer nodes may respond to the task advertisement(s) using one or more peer-to-peer platform protocols, such as the peer-to-peer platform protocols of the JXTA platform. In one embodiment, task advertisement(s) may include information configured for use in responding to the task advertisement(s). Note that, in one embodiment, peer nodes on the network may respond to the task advertisement(s) even if the peer node did not respond to the code advertisement and/or did not receive the code from the peer node. In one embodiment, if a peer node that has not received the code responds to the task advertisement(s), the originating peer node may choose to provide code to the responding peer node so that the peer node may execute one or more tasks as assigned.

As indicated at 3104, the peer node may assign a different one of the plurality of tasks to each of a plurality of peer nodes that responds to the task advertisement(s). In one embodiment, assigning a task to a particular peer node may include sending a message to the peer node indicating the particular task to be performed by the peer node. In one embodiment, the message may include one or more parameters indicating the particular task to be performed by the peer node. Each peer node receiving a task assignment may receive different values for the parameters to indicate the particular task to be performed by the peer node. In one embodiment, the tasks may be assigned according to the exemplary distributed computing framework described above. In one embodiment, task assignments may be transmitted to peer nodes according to a network information transfer protocol. In one embodiment, the network information transfer protocol may be HTTP.

Each of the peer nodes that received a task assignment may then perform the particular assigned task in accordance with the code received from the originating peer node as indicated at 3106. Each task may be executed according to code to perform a particular portion of the job that the originating peer node desires to execute using the distributed computing mechanism described herein. In one embodiment, the tasks may be executed according to the exemplary distributed computing framework described above.

As indicated at 3108, the plurality of peer nodes assigned tasks may return results of the assigned tasks to the originating peer node. As each peer node completes its assigned task, the peer node may return results of the task to the originating peer node. In one embodiment, results may be transmitted according to a network information transfer protocol. In one embodiment, the network information transfer protocol may be HTTP. In one embodiment, the results may be returned to the originating peer node according to the exemplary distributed computing framework described above.

If there are more tasks to be performed, a peer node that completes a task may receive another task assignment from the originating peer node. In one embodiment, a peer node that completes a task may send a message to peer node requesting another task assignment, if any are available. Peer nodes may continue receiving task assignments and executing tasks until all tasks for the job are completed. The originating peer node may store results of completed tasks until all tasks of the job are completed. The peer node may then post-process results of the completed job, if desired.

Figure 21:
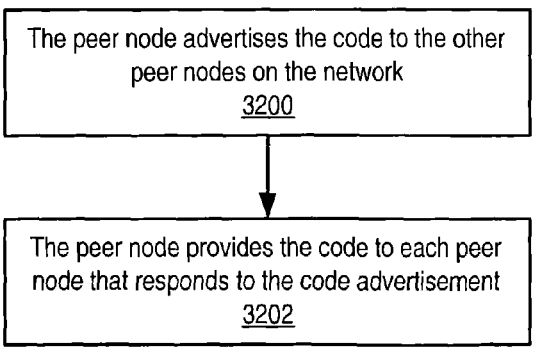
FIG. 21 is a flowchart illustrating a method of providing code to a plurality of peer nodes on a network according to one embodiment.

FIG. 21 is a flowchart illustrating a method of providing code to a plurality of peer nodes on a network according to one embodiment. The method illustrated in FIG. 21 illustrates means for the distributed computing mechanism to provide computer-executable code to a plurality of peer nodes on a network. In one embodiment, the method illustrated in FIG. 21 may be implemented and performed according to the exemplary distributed computing framework described above. A peer node on a network may have generated computer-executable code configured to run a plurality of tasks in parallel on two or more peer nodes on the network to perform a job. In one embodiment, the code may be programmed in a bytecode language. In one embodiment, the bytecode language may be the Java programming language. As indicated at 3200, the peer node may advertise the code to other peer nodes on the network.

In one embodiment, the peer node may broadcast an advertisement for the code on the network. Other embodiments may use other mechanisms to advertise the code on the network. In one embodiment, the code may be advertised using one or more advertisement mechanisms such as those of the JXTA platform, and advertising the code may be performed using one or more peer-to-peer platform (e.g. JXTA) protocols. In one embodiment, the code may be advertised according to the exemplary distributed computing framework described above. It is important to note that code may be generated on and advertised from any peer node (or, in one embodiment, any node) coupled to the network.

Any or all peer nodes coupled to the network may receive the code advertisement. In one embodiment, the code advertisement may be received using one or more advertisement mechanisms such as those of the JXTA platform. In one embodiment, one or more peer nodes that receive the code advertisement may be on opposite sides of a firewall or firewalls from the originating peer node.

One or more of the peer nodes that receive the code advertisement may respond to the code advertisement, if desired. In one embodiment, peer nodes that are configured to execute the computer language in which the code is implemented may respond to the code advertisement. In one embodiment, responding peer nodes may implement containers (e.g. JVMs) in which the code may be executed. In one embodiment, peer nodes may respond to the code advertisement by sending a response message requesting the code to the originating peer node. In one embodiment, peer nodes may respond to the code advertisement using one or more peer-to-peer platform protocols, such as the peer-to-peer platform protocols of the JXTA platform. In one embodiment, the code advertisement may include information configured for use in responding to the code advertisement.

As indicated at 3002, the originating peer node may provide the code to each peer node that responds to the code advertisement. In one embodiment, to provide the code to a peer node, the originating peer node may transmit the code to the peer node according to a network information transfer protocol. In one embodiment, the network information transfer protocol may be HTTP. Other embodiments may use other network information transfer protocols to transmit the code. After the peer node provides the to the other peer nodes, each of the peer nodes that received the code may include a copy of the code. In one embodiment, a peer node that receives the code may store the code to a local storage, e.g. a disk device or other non-volatile storage.

The following is an example of using an embodiment of the distributed computing mechanism and is included for illustrative purposes and is not intended to be limiting. In one embodiment, this example may be implemented on peer nodes implementing the distributed computing mechanism according to a distributed computing framework such as the exemplary distributed computing framework described above. This example uses the Java programming language, but it is noted that other embodiments may use other programming languages. In this example, the class implementing the distributed computing mechanism is called RemoteThread. This example illustrates that the distributed computing mechanism described herein may be used to parallelize execution of tasks in performing work in a distributed heterogeneous networked environment.

This example uses an embodiment of the distributed computing mechanism to compute the sum of all integers between 1 and 1000. The calculation may be split into several tasks. For example, to divide the work into ten tasks, the first task may be the addition of all the integers between 1 and 100, the second task may be the addition of all the integers between 101 and 200, etc.

In one embodiment, there may be separate codes for execution kernel and job submission parts. To use the distributed computing mechanism to do this exemplary calculation on several peer nodes, the core of the calculation is implemented in a code, e.g., AddNumbers.java:

```
Import java.io.Serializable;
public class AddNumbers implements Runnable, Serializable
(
    private int result;    // This variable will contain the sum of
                           // all the numbers between first and last
    private int first;
    private int last;
    public AddNumbers(int first, int last)
    {
        result = 0;
        this.first = first;
        this.last = last;
    };
    public void run( )
    {
        // loop calculating the sum
        for (int i=first; i <=last; i++)
            result += i;
    );
// This method returns the result after execution of the run( ) method
    public int getResult( )
    {
        return result;
    };
};
```

This class implements Runnable to enable passing to a RemoteThread, and Serializable for the class instances to be sent using IO streams over HTTP. The AddNumbers constructor may be used to initialize the data. AddNumbers takes arguments that may include information for the code to execute (in this case, the first and last integers of the particular task). AddNumbers class instances differentiate from other instances of AddNumbers through the way they are constructed. The run( ) method is the core of the calculation.

Since the run( ) method may be invoked remotely on a machine unknown to the job submitter, the run( ) method preferably does not include anything requiring user interaction or displaying graphics. Once the run( ) method has been executed, the AddNumbers object may include the result of the calculation (in this case, the sum of all integers between the indicated first and last integers for the particular task, inclusive).

The submission mechanism RemoteThread may be used to submit the tasks to the cluster (group) of peers on the network. RemoteThread may be triggered from a second exemplary Java code:

```
public class myApp
{
    public myApp( )
    {
        // Split the job into 10 tasks, each element in the returned
        // array contains a task, i.e., an instance of the
        // AddNumbers class that contains enough information to run
        // the code
        AddNumbers[ ] tasks = prepareTasks(10);
        // Create an instance of RemoteThread with :
        // (a) the array of individual tasks,
        // (b) the directory where the class files for the code are.
        RemoteThread remoteTh =
            new RemoteThread(tasks, new File("AddNumbers"));
        remoteTh.start( ); // Start the job.
        remoteTh.join(10000);   // Check every 10 secs whether the job
                                // has completed.
        // Retrieve the results.
        Runnable[ ] run = (Runnable[ ]) remoteTh.getRunnable( );
        if (run != null)
            // Process the results
            postprocess (run);
        // Call remove( ) and quit( ) method to stop the RemoteThread
        // cleanly
        removeTh.remove( );
        remoteTh.quit( );
        System.exit(0);
    }
    private AddNumbers[ ] prepareTasks (int numberOfJobs)
    {
        // Create the instances of AddNumbers class for each task
        AddNumbers[ ] task = new AddNumbers [numberOfJobs];
        for (int i=0; i <numberOfJobs; i++)
            tasks[i] = new AddNumvers (1+(i*1000)/numberOfJobs,
                        ((i+1)*1000)/numberOfJobs);
        return tasks;
    }
    private void postprocess(Runnable[ ] run)
    {
        int sum = 0;
        for (int i = 0; i<run.length; i++)
            sum += ((AddNumbers)run[i]).getResult ( );
        System.out.println("sum = " + sum);
    }
    public static void main (String args[ ]) {
        myApp app = new myApp ( );
    }
}
```

Each task may be identified by one or more values. Using this exemplary code, ten tasks may be run. In this example, each task is identified by the first and last integers of the integers to be added. These values may be passed to the constructor of AddNumbers, and stored in two private integers. At this point, each task is well defined and may be run. A RemoteThread may be created. Two arguments are passed to the RemoteThread, the array of AddNumbers, and the directory in which the class AddNumbers.class is located. The start( ) method may be called to send the tasks to the peer nodes participating in the computation on the network.

In this example, every 10,000 milliseconds a check may be made to determine if the tasks have completed. The join( ) method returns only when all the tasks have completed. After all the tasks are completed, the results of the individual tasks may be retrieved using the getResult( ) method of RemoteThread. In one embodiment implemented according to the distributed computing framework described herein, the remove( ) method removes all tasks belonging to this job from the task repository. If this method is not called, the memory requirements of the repository manager may increase in time. The quit( ) method may be called before exiting the application to quit cleanly.

The following is another example of using an embodiment of the distributed computing mechanism and is included for illustrative purposes and is not intended to be limiting. In one embodiment, this example may be implemented on peer nodes implementing the distributed computing mechanism according to a distributed computing framework such as the exemplary distributed computing framework described above. This example uses the Java programming language, but it is noted that other embodiments may use other programming languages. This example illustrates that the distributed computing mechanism described herein may be used to parallelize execution of tasks in performing work in a distributed heterogeneous networked environment. In one embodiment, the execution kernel and job submission parts of the code may be combined. The following example illustrates the AddNumbers.java code incorporated in the myApp.java code and is included for illustrative purposes and is not intended to be limiting. In this example, the myApp code includes the run( ) method of the Runnable interface:

```
import java.io.Serializable;
public class myApp implements Runnable, Serializable
{
    private int result;
    private int first;
    private int last;
    public myApp (int first, int last)
    {
        result = 0;
        this.first = first;
        this.last = last;
    };
    public myApp( )
    {
        // Split the job into 10 tasks, each element in the
        // returned array contains
        AddNumbers[ ] tasks = prepareTasks(10);
        // a task, i.e., an instance of the AddNumbers class that
        // contains enough information to run the code.
        // Create an instance of RemoteThread with:
        // (a) the array of individual tasks,
        // (b) the directory where the class files for the code are.
        RemoteThread remoteTh =
            new RemoteThread(tasks, new File("AddNumbers"));
        RemoteTh.start( ); // Start the job
        RemoteTh.join(10000);    // Check every 10 seconds whether
                                 // the job has completed.
        // Retrieve the results.
        Runnable[ ] run = (Runnable[ ])remoteTh.getRunnable( );
        if (run != null)
            // Process the results
            postprocess (run);
//Call remove( ) and quit( ) methods to stop the RemoteThread cleanly
        removeTh.remove( );
        remoteTh.quit( );
        System.exit(0);
    }
    public void run( )
    {
        // loop calculating the sum
```

-continued

```
        for (int i=first; i<=last; i++)
            result =+i;
    );
    public int getResult( )
    {
        return result;
    };
    private AddNumbers[ ] prepareTasks (int numberOfJobs)
    {
        // Create the instances of AddNumbers class for each task
        AddNumbers[ ] task = new AddNumbers[numberOfJobs];
        for (int i=0; i<numberOfJobs; i++)
            task[i] = new AddNumbers(1+(i*1000)/numberOfJobs,
                                    ((i+1)*1000)/numberOfJobs);
        return tasks;
    }
    private void postprocess (Runnable[ ] run)
    {
        int sum = 0;
        for (int i = 0; i<run.length; i++)
            sum += ((AddNumbers)run[i]).getResult( );
        Ssytem.out.println("sum = " + sum);
    }
    public static void main (String args[ ]) {
        myApp f = new myApp( );
    }
}
```

The differences between the first example and this example are noted here. In this example, myApp implements Runnable and Serializable and defines the run( ) method. In this example, there are two different constructors for myApp. The first constructor takes two arguments and may be called to construct the Runnable tasks to the distributed computing mechanism. The second constructor may be used by the job submitter to the distributed computing mechanism. The second constructor is different from the first constructor in that preparation of the work and initialization of the ten tasks is performed by the second constructor. The second constructor may include one or more Graphical User Interfaces (GUIs) for interaction with the job submitter.

The Runnable interface may be implemented by all the codes to be run in parallel on the cluster or group of peer nodes. The Runnable interface may include a run( ) method which takes no argument and returns void. In one embodiment, the Runnable interface may be the same as or similar to the java.lang.Runnable interface. The RemoteThread class may be similar to the java.lang.Thread class and may be used by the application writer to submit an application to be run in parallel to the cluster of peers.

The following is an exemplary description of a process to submit tasks in parallel using embodiments of the distributed computing mechanism. There may be one or more different constructors for RemoteThread. One exemplary RemoteThread constructor is:

public RemoteThread(File codeDir)

Using this constructor to create an instance of the RemoteThread class, the argument is the directory where the classes containing the code to be passed to the peer nodes that will perform the tasks in parallel is located. This code may implement the Runnable interface. With this constructor, the classes may be sent to other peer nodes when the start( ) method is called.

Another exemplary RemoteThread constructor is:
public RemoteThread(Runnable task, File codeDir)

Using this constructor to create an instance of the RemoteThread class, the arguments are a task implementing the Runnable interface, and the directory where the classes containing the code to be passed to the peer nodes that will perform the tasks in parallel is located, as described for the first exemplary constructor. When the start( ) method is called, the classes and the task may be sent to other peer nodes.

Yet another exemplary RemoteThread constructor is:
public RemoteThread(Runnable[ ] tasks, File codeDir):

Using this constructor to create an instance of the RemoteThread class, the arguments are a set of tasks implementing the Runnable interface, and the directory where the classes containing the code to be passed to the peer nodes that will perform the tasks in parallel is located, as described for the first exemplary constructor. When the start( ) method is called, the classes and the tasks may be sent to the other peer nodes.

Still yet another exemplary RemoteThread constructor is:
public RemoteThread (Runnable[ ] [ ] tasks, File codeDir)

This constructor is similar to the previous constructor, except that it takes a set of Runnable arrays. All of the Runnable objects in a given array are executed serially on a single remote or local peer node, while each array in the set may be run separately on different peer nodes. In the previous constructor, each Runnable object constituted an indivisible amount of work; in this constructor, the indivisible amount of work is an array of Runnable objects. This constructor may be used, for example, when the execution time of a single Runnable object is short, and grouping several Runnable objects together may improve the overall performance by decreasing the communication overhead. The results may not be accessible until all of the arrays in the set have completed.

A start( ) method may be called to submit the array of tasks to the group of peer nodes, for example:
public void start( )
A join( ) method may be called, for example:
public void join(int timeInterval)

In this exemplary join( ) method, a time interval may be specified to determine how often the RemoteThread should check whether the job submitted has completed.

A method may be called to retrieve the array of Runnable tasks that contain the results of the code executions. The object returned may be of the type Runnable, Runnable[ ] or Runnable[ ] [ ], depending on the constructor. For example, the following method may be called:
public object getRunnable( )

In one embodiment, methods may be called to remove the array of Runnable objects containing the results from the code repository and to clean up the RemoteThread before quitting the user application. For example, the following methods may be called:
void remove( )
void quit( )

Conclusion

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a processor; and
   a memory comprising program instructions, wherein the program instructions are executable by the processor to implement:
      a virtual machine;
      a default class loader for the virtual machine, configured to:
         load classes for code executable within the virtual machine on the system from one or more local locations indicated by a class path of the default class loader;
         determine that a class needed to execute the code on the system is not stored in the one or more locations indicated by the class path; and
         generate an indication that the class is not loaded;
      a remote class loader mechanism configured to:
         detect the indication that the class is not loaded;
         obtain the class from a remote system via a network; and
         store the class in a location indicated by the class path of the default class loader on the system;
      wherein the remote class loader mechanism is not a subclass of the default class loader, and is configured to perform said detect, said obtain, and said store separate from and transparent to the default class loader, and wherein the default class loader is independent from the remote class loader mechanism;
      wherein the default class loader is configured to load the class from the location indicated by the class path, and wherein the default class loader being configured to load the class from the location avoids class conflicts; and
      wherein, to load the class from the location indicated by the class path, the default class loader is configured to:
         locate the class stored in the location indicated by the class path; and
         load the class from the location for access by the code.

2. The system as recited in claim 1, wherein the location is a default directory for storing remote classes.

3. The system as recited in claim 1, wherein the location is a user-specified directory for storing remote classes.

4. The system as recited in claim 1, wherein said indication is an exception generated by the code and indicating that the class is not stored in the one or more locations indicated by the class path.

5. The system as recited in claim 1, wherein, to obtain the class from a remote system, the remote class loader mechanism is further configured to send a message requesting the class to one or more remote systems, wherein the message comprises information about the class for identifying a class file on the remote system that comprises the requested class.

6. The system as recited in claim 1, wherein, to obtain the class from a remote system, the remote class loader mechanism is further configured to:
   send a message requesting the class to the remote system; and
   receive the class from the remote system in one or more messages in response to the message.

7. The system as recited in claim 1, wherein, to obtain the class from a remote system, the remote class loader mechanism is further configured to:
   broadcast a message requesting the class to one or more remote systems including the remote system on the network; and
   receive the class from the remote system in one or more messages in response to the broadcast message.

8. The system as recited in claim 7, wherein the one or more remote systems and the system are member peers of a peer group in a peer-to-peer network environment.

9. The system as recited in claim 1, wherein the virtual machine is a Java Virtual Machine (JVM).

10. The system as recited in claim 1, wherein the code is in a bytecode computer language.

11. The system as recited in claim 1, wherein the code is Java code.

12. The system as recited in claim 1, wherein the system and the remote system are peer nodes configured to participate in a peer-to-peer environment on the network.

13. The system as recited in claim 1, wherein the system and the remote system are configured to participate as peer nodes in a peer-to-peer environment on the network in accordance with one or more peer-to-peer platform protocols for enabling the peer nodes to discover each other, communicate with each other, and cooperate with each other to form peer groups in the peer-to-peer environment.

14. The system as recited in claim 1, wherein the code is a code fragment of an application configured for execution on the system, and wherein the remote system is a node in a distributed computing framework that comprises the application and is configured to provide computer-executable code fragments of the application to two or more other systems to run the code fragments in parallel to execute the application.

15. The system as recited in claim 1, wherein the system and the remote system are configured to participate in a distributed computing system on the network for submitting computational tasks in a distributed heterogeneous networked environment that utilizes peer groups to decentralize task dispatching and post-processing functions and enables a plurality of jobs to be managed and run simultaneously.

16. A distributed computing system, comprising:
   a master node configured to provide computer-executable code fragments of an application to a plurality of worker nodes on a network, wherein the code fragments are configured to run tasks in parallel on two or more of the plurality of worker nodes to perform a job;
   a worker node configured to receive a code fragment from the master peer node;
   wherein the worker node comprises a virtual machine and a default class loader for the virtual machine, wherein the default class loader is configured to:
      load classes for the code fragment executable within the virtual machine from one or more local locations indicated by a class path of the default class loader;
      determine that a class needed to execute the code fragment is not stored in the one or more locations indicated by the class path;
   wherein the worker node further comprises a remote class loader configured to:
      detect that the class is not loaded;
      obtain the class from a remote node via the network; and
      store the class in a location indicated by the class path of the default class loader on the worker node;

wherein the remote class loader is not a subclass of the default class loader, and is configured to perform said detect, said obtain, and said store separate from and transparent to the default class loader, and wherein the default class loader is independent from the remote class loader;

wherein the default class loader is further configured to load the class from the location indicated by the class path, and wherein the default class loader being configured to load the class from the location avoids class conflicts; and wherein, to load the class from the location indicated by the class path, the default class loader is configured to:
locate the class stored in the location indicated by the class path; and
load the class from the location for access by the code fragment.

17. The distributed computing system as recited in claim 16, wherein the location is a default directory for storing remote classes.

18. The distributed computing system as recited in claim 16, wherein the location is a user-specified directory for storing remote classes.

19. The distributed computing system as recited in claim 16, wherein, to detect that the class is not loaded, the remote class loader is further configured to detect an exception generated by the code fragment and indicating that the class is not on the worker node.

20. The distributed computing system as recited in claim 16, wherein, to obtain the class from a remote node, the remote class loader is further configured to send a message requesting the class to the remote node, wherein the message comprises information about the class for identifying a class file that comprises the requested class.

21. The distributed computing system as recited in claim 16, wherein the master node is the remote node, and wherein, to obtain the class from a remote node, the remote class loader is further configured to:
send a message requesting the class to the master node; and
receive the class from the master node in one or more messages in response to the message.

22. The distributed computing system as recited in claim 16, wherein, to obtain the class from a remote node, the remote class loader is further configured to:
broadcast a message requesting the class to one or more remote nodes on the network; and
receive the class from the remote node in one or more messages in response to the broadcast message.

23. The distributed computing system as recited in claim 22 wherein the one or more remote nodes, the worker node, and the master nodes are member peers of a peer group in a peer-to-peer network environment.

24. The distributed computing system as recited in claim 22, wherein the one or more remote nodes are worker nodes configured to receive code fragments from the master node.

25. The distributed computing system as recited in claim 16, wherein the virtual machine is a Java Virtual Machine (JVM).

26. The distributed computing system as recited in claim 16, wherein the code fragment is in a bytecode computer language.

27. The distributed computing system as recited in claim 16, wherein the code fragment is Java code.

28. The distributed computing system as recited in claim 16, wherein the worker node and the master node are peer nodes configured to participate in a peer-to-peer environment on the network.

29. The distributed computing system as recited in claim 16, wherein the worker node and the master node are configured to participate as peer nodes in a peer-to-peer environment on the network in accordance with one or more peer-to-peer platform protocols for enabling the peer nodes to discover each other, communicate with each other, and cooperate with each other to form peer groups in the peer-to-peer environment.

30. A system, comprising:
a default class loader means for a virtual machine, wherein the default class loader means is configured to load classes for code executable within the virtual machine on the system from one or more local locations indicated by a class path of the default class loader means;
a remote class loader means comprising:
means for determining that a class needed to execute the code on the system is not stored in the one or more locations indicated by the class path;
means for obtaining the class from a remote system via a network; and
means for storing the class in a location on the system indicated by the class path of the default class loader means;
wherein said remote class loader means is not a subclass of the default class loader means and is configured to operate separate from and transparent to the default class loader, and wherein the default class loader means is independent from said remote class loader means;
wherein the default class loader means is configured to load the class from the location indicated by the class path, and wherein the default class loader means being configured to load the class from the location avoids class conflicts; and
wherein, to load the class from the location indicated by the class path, the default class loader means is configured to:
locate the class stored in the location indicated by the class path; and
load the class from the location for access by the code.

31. A method, comprising:
loading classes for code executing within a virtual machine on a system from one or more local locations indicated by a class path of a default class loader for the virtual machine;
determining that a class needed to execute the code on the system is not stored in the one or more locations indicated by the class path;
generating an indication that the class is not loaded;
detecting the indication that the class is not loaded;
obtaining the class from a remote system via a network in response to said detecting;
storing the class in a location indicated by the class path of the default class loader on the system;
wherein said loading, said determining, and said generating are performed by the default class loader,
wherein said detecting, said obtaining, and said storing are performed by a remote class loader mechanism, said remote class loader mechanism is not a subclass of the default class loader and is configured to perform said detecting, said obtaining, and said storing separate from and transparent to the default class loader, and wherein the default class loader is independent from said remote class loader mechanism;
the default class loader loading the class from the location indicated by the class path, wherein the default class loading the class from the location avoids class conflicts; and wherein said loading the class from the location indicated by the class path further comprises:
the default class loader locating the class stored in the location indicated by the class path; and
the default class loader loading the class from the location for access by the code.

32. The method as recited in claim 31, wherein the location is a default directory for storing remote classes.

33. The method as recited in claim 31, wherein the location is a user-specified directory for storing remote classes.

34. The method as recited in claim 31, said indication is an exception generated by the code and indicating that the class is not stored in the one or more locations indicated by the class path.

35. The method as recited in claim 31, wherein obtaining the class from a remote system comprises sending a message requesting the class to one or more remote systems, wherein the message comprises information about the class for identifying a class file on the remote system that comprises the requested class.

36. The method as recited in claim 31, wherein said obtaining the class from a remote system comprises:
sending a message requesting the class to the remote system; and
receiving the class from the remote system in one or more messages in response to the message.

37. The method as recited in claim 31, wherein said obtaining the class from a remote system comprises:
broadcasting a message requesting the class to one or more remote systems on the network; and
receiving the class from the remote system in one or more messages in response to the broadcast message.

38. The method as recited in claim 37, wherein the one or more remote systems and the system are member peers of a peer group in a peer-to-peer network environment.

39. The method as recited in claim 31, wherein the virtual machine is a Java Virtual Machine (JVM).

40. The method as recited in claim 31, wherein the code is in a bytecode computer language.

41. The method as recited in claim 31, wherein the code is Java code.

42. The method as recited in claim 31, wherein the system and the remote system are peer nodes configured to participate in a peer-to-peer environment on the network.

43. The method as recited in claim 31, wherein the system and the remote system are configured to participate as peer nodes in a peer-to-peer environment on the network in accordance with one or more peer-to-peer platform protocols for enabling the peer nodes to discover each other, communicate with each other, and cooperate with each other to form peer groups in the peer-to-peer environment.

44. The method as recited in claim 31, wherein the code is a code fragment of an application configured for execution on the system, and wherein the remote system is a node in a distributed computing framework that comprises the application and is configured to provide computer-executable code fragments of the application to two or more other systems to run the code fragments in parallel to execute the application.

45. The method as recited in claim 31, wherein the system and the remote system are configured to participate in a distributed computing system on the network for submitting computational tasks in a distributed heterogeneous networked environment that utilizes peer groups to decentralize task dispatching and post-processing functions and enables a plurality of jobs to be managed and run simultaneously.

46. A computer-accessible storage medium, comprising program instructions, wherein the program instructions are computer-executable to implement:
loading classes for code executing within a virtual machine on a system from one or more local locations indicated by a class path of a default class loader for the virtual machine;
determining that a class needed to execute the code on the system is not stored in the one or more locations indicated by the class path;
generating an indication that the class is not loaded;
detecting the indication that the class is not loaded;
obtaining the class from a remote system via a network;
storing the class in a location indicated by the class path of the default class loader on the system;
wherein said loading, said determining, and said generating are performed by the default class loader;
wherein said detecting, said obtaining, and said storing are performed by a remote class loader mechanism, said remote class loader mechanism is not a subclass of the default class loader and is configured to perform said detecting, said obtaining, and said storing separate from and transparent to the default class loader, and wherein the default class loader is independent from said remote class loader mechanism;
the default class loader loading the class from the location indicated by the class path, and wherein the default class loader loading the class from the location avoids class conflicts; and
wherein, in said loading the class from the location indicated by the class path, the program instructions are further computer-executable to implement:
the default class loader locating the class stored in the location indicated by the class path; and
the default class loader loading the class from the location for access by the code.

47. The computer-accessible storage medium as recited in claim 46, wherein the location is a default directory for storing remote classes.

48. The computer-accessible storage medium as recited in claim 46, wherein the location is a user-specified directory for storing remote classes.

49. The computer-accessible storage medium as recited in claim 46, wherein said indication is an exception generated by the code and indicating that the class is not stored in the one or more locations indicated by the class path.

50. The computer-accessible storage medium as recited in claim 46, wherein, in said obtaining the class from a remote system, the program instructions are further computer-executable to implement sending a message requesting the class to one or more remote systems, wherein the message comprises information about the class for identifying a class file on the remote system that comprises the requested class.

51. The computer-accessible storage medium as recited in claim 46, wherein, in said obtaining the class from a remote system, the program instructions are further computer-executable to implement:
sending a message requesting the class to the remote system; and
receiving the class from the remote system in one or more messages in response to the message.

52. The computer-accessible storage medium as recited in claim 46, wherein, in said obtaining the class from a remote system, the program instructions are further computer-executable to implement:
broadcasting a message requesting the class to one or more remote systems on the network; and receiving the class from the remote system in one or more messages in response to the broadcast message.

53. The computer-accessible storage medium as recited in claim 52, wherein the one or more remote systems and the system are member peers of a peer group in a peer-to-peer network environment.

54. The computer-accessible storage medium as recited in claim 46, wherein the virtual machine is a Java Virtual Machine (JVM).

55. The computer-accessible storage medium as recited in claim 46, wherein the code is in a bytecode computer language.

56. The computer-accessible storage medium as recited in claim 46, wherein the code is Java code.

57. The computer-accessible storage medium as recited in claim 46, wherein the system and the remote system are peer nodes configured to participate in a peer-to-peer environment on the network.

58. The computer-accessible storage medium as recited in claim 46, wherein the system and the remote system are configured to participate as peer nodes in a peer-to-peer environment on the network in accordance with one or more peer-to-peer platform protocols for enabling the peer nodes to discover each other, communicate with each other, and cooperate with each other to form peer groups in the peer-to-peer environment.

59. The computer-accessible storage medium as recited in claim 46, wherein the code is a code fragment of an application configured for execution on the system, and wherein the remote system is a node in a distributed computing framework that comprises the application and is configured to provide computer-executable code fragments of the application to two or more other systems to run the code fragments in parallel to execute the application.

60. The computer-accessible storage medium as recited in claim 46, wherein the system and the remote system are configured to participate in a distributed computing system on the network for submitting computational tasks in a distributed heterogeneous networked environment that utilizes peer groups to decentralize task dispatching and post-processing functions and enables a plurality of jobs to be managed and run simultaneously.

* * * * *